US008289954B2

(12) United States Patent
Tenny et al.

(10) Patent No.: US 8,289,954 B2
(45) Date of Patent: Oct. 16, 2012

(54) SPLIT AND SEQUENTIAL PAGING FOR VOICE CALL CONTINUITY

(75) Inventors: Nathan Edward Tenny, Poway, CA (US); Oronzo Flore, Ostuni (IT)

(73) Assignee: Qualcomm Incorporated, San Diego, CA (US)

( * ) Notice: Subject to any disclaimer, the term of this patent is extended or adjusted under 35 U.S.C. 154(b) by 1107 days.

(21) Appl. No.: 12/106,598

(22) Filed: Apr. 21, 2008

(65) Prior Publication Data

US 2008/0273524 A1    Nov. 6, 2008

Related U.S. Application Data

(60) Provisional application No. 60/915,424, filed on May 1, 2007.

(51) Int. Cl.
*H04L 12/66* (2006.01)

(52) U.S. Cl. ........................................................ 370/352

(58) Field of Classification Search ........................ None
See application file for complete search history.

(56) References Cited

U.S. PATENT DOCUMENTS

| 5,940,456 | A | 8/1999 | Chen et al. | |
|---|---|---|---|---|
| 5,940,756 | A | 8/1999 | Sibecas et al. | |
| 6,463,054 | B1 | 10/2002 | Mazur et al. | |
| 7,961,714 | B1 * | 6/2011 | Watson et al. | 370/352 |
| 7,995,562 | B2 * | 8/2011 | Purnadi et al. | 370/352 |
| 2007/0049281 | A1 * | 3/2007 | Chen et al. | 455/445 |
| 2007/0117575 | A1 * | 5/2007 | Courau et al. | 455/458 |
| 2008/0026752 | A1 | 1/2008 | Flore et al. | |

FOREIGN PATENT DOCUMENTS

| JP | 10108239 A | 4/1998 |
|---|---|---|
| JP | 11046250 A | 2/1999 |
| JP | 2000138967 A | 5/2000 |
| JP | 2004336384 A | 11/2004 |
| WO | 2006/138736 | 12/2006 |
| WO | WO2007038272 A2 | 4/2007 |

OTHER PUBLICATIONS

3GFP TS 23.203 V0.4.0; 3RD Generation Partnership Project; Technical Specification Group Services and System Aspects; Voice Call Continuity Between CS an IMS; Stage 2 (Release 7) (Apr. 2006).
International Search Report—PCT/US08/062117, International Search Authority—European Patent Office—Aug. 19, 2008.
Written Opinion—PCT/US08/062117, International Search Authority—European Patent Office—Aug. 19, 2008.
Taiwanese Search report—097116139—TIPO—Dec. 26, 2011.

\* cited by examiner

*Primary Examiner* — Chirag Shah
*Assistant Examiner* — Minh-Trang Nguyen
(74) *Attorney, Agent, or Firm* — Peng Zhu; Kam T. Tam

(57) ABSTRACT

Systems and methodologies are described that facilitate paging for establishing a Voice Call Continuity (VCC)-supported voice call in a network containing access point(s) that can support packet switched (PS) voice communication, such as Voice over Internet Protocol (VoIP), and access point(s) that can support only circuit switched (CS) voice communication. Paging signals as described herein are selectively delivered, such that a desired terminal receives a single PS paging signal if located at a VoIP-capable access point and a single CS paging signal otherwise. A split paging technique is described herein, wherein PS paging signals are delivered to VoIP-capable access points and CS paging signals are delivered to non-VoIP-capable access points substantially simultaneously. Additionally, a sequential paging technique is described herein, wherein PS paging signals are delivered to VoIP-capable access points and, if no response is received from a desired terminal, CS-domain paging is conducted.

41 Claims, 15 Drawing Sheets

SPLIT AND SEQUENTIAL PAGING FOR VOICE CALL CONTINUITY

CROSS-REFERENCE

This application claims the benefit of U.S. Provisional Application Ser. No. 60/915,424, filed May 1, 2007, and entitled "SPLIT AND SEQUENTIAL PAGING FOR VOICE CALL CONTINUITY," the entirety of which is incorporated herein by reference.

BACKGROUND

I. Field

The present disclosure relates generally to wireless communications, and more specifically to techniques for conducting paging in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

Voice Call Continuity (VCC) is a process by which a voice call at a wireless terminal is maintained as the wireless terminal moves from the coverage of one cell to the coverage of another cell. Conventionally, a VCC application server (AS) is utilized in a wireless communication system to support VCC by anchoring a voice call at a wireless terminal and managing handover of the voice call between cells. To establish a voice call at a wireless terminal in a system that supports VCC, a VCC AS can initiate paging of the wireless terminal.

To establish a VCC-supported call on a network that supports voice communication in the packet switched (PS) radio domain (e.g., through Voice over Internet Protocol (VoIP)) that can be relocated to a network that supports only circuit switched (CS) voice communication or vice versa, the VCC AS may not have knowledge of whether a base station serving a particular wireless terminal supports PS voice communication. As a result, a VCC AS is conventionally required in such a situation to page indiscriminately through both the CS and PS domains. In turn, this can cause a wireless terminal to receive two ostensibly independent pages simultaneously, which can be falsely interpreted by the terminal as a conflict. Further, if a terminal receives a PS page while being served by an access point that supports low-rate PS services but does not support PS voice communication, the terminal may respond to the page and unsuccessfully attempt to establish a PS call. In such a situation, it is desirable for the terminal to establish a CS call rather than a PS call, but conventionally there is no way to ensure that a CS page will arrive at the terminal before a PS page.

Accordingly, there exists a need in the art for techniques by which a VCC-supported voice call can be established in a network containing access point(s) that can support PS voice communication as well as access point(s) that can support only CS voice communication.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method for conducting paging in a wireless communication system is described herein. The method can comprise initiating paging in one or more of a circuit switched (CS) radio domain and a packet switched (PS) radio domain for a terminal located in a network that includes one or more base stations that are capable of voice communication in the PS radio domain and one or more base stations that are not capable of voice communication in the PS radio domain; and configuring one or more of a CS-domain paging request or a PS-domain paging request such that the one or more paging requests cause a single paging signal to be communicated to the terminal, wherein the paging signal is in an optimal radio domain for voice communication based on capabilities of a base station serving the terminal.

Another aspect relates to a wireless communications apparatus that can comprise a memory that stores data relating to a wireless communication network comprising one or more Node Bs that are capable of Voice over Internet Protocol (VoIP) communication and one or more Node Bs that are not capable of VoIP communication and a user equipment (UE) in the wireless communication network for which a voice communication session is to be established. The wireless communications apparatus can further comprise a processor configured to trigger paging in one or more of a CS domain and a PS domain for the UE and to construct one or more of a paging request for the CS domain and a paging request for the PS domain such that the one or more paging requests cause the UE to receive a single page in a radio domain selected based at least in part on capabilities of a Node B in the network having a coverage area that includes the UE.

Yet another aspect relates to an apparatus that facilitates establishing a voice call with a mobile terminal located in a network comprising at least one VoIP-capable Node B and at least one non-VoIP-capable Node B. The apparatus can comprise means for initiating paging in one or more of a CS radio domain and a PS radio domain; and means for generating at least one of a CS-domain paging request or a PS-domain paging request to cause the mobile terminal to receive one paging signal, wherein the paging signal is in the PS radio domain if the mobile terminal is served by a VoIP-capable Node B and the paging signal is in the CS radio domain if the mobile terminal is served by a non-VoIP-capable Node B.

Still another aspect relates to a computer-readable medium, which can comprise code for causing a computer to initialize one or more of CS paging and PS paging for a terminal located in a network containing VoIP-capable access points (APs) and non-VoIP-capable APs; and code for causing a computer to instruct selective delivery of CS pages and PS pages such that the terminal receives a single page, where the page is a PS page if the terminal is located at a VoIP-capable AP and the page is a CS page otherwise.

A further aspect relates to an integrated circuit that can execute computer-executable instructions for establishing a voice call with an access terminal in a mixed VoIP-capable/non-VoIP-capable network. The instructions can comprise triggering one or more of CS paging and PS paging; and managing selective delivery of one or more of a CS paging signal or a PS paging signal to the access terminal such that a PS paging signal is delivered to the access terminal if the access terminal has VoIP coverage in the network and a CS paging signal is delivered to the access terminal if the access terminal does not have VoIP coverage in the network.

According to an additional aspect, a method for establishing a voice call with a UE is described herein. The method can comprise receiving one or more of a paging request in the PS radio domain and a paging request in the CS radio domain, the one or more paging requests denote that paging is to be performed to establish a voice call for a UE located in a network containing one or more Node Bs that are capable of PS voice communication and one or more Node Bs that are not capable of PS voice communication; and one or more of transmitting a PS-domain paging signal to a Node B that is capable of PS voice communication or transmitting a CS-domain paging signal to a Node Bs that is not capable of PS voice communication.

Another aspect relates to a wireless communications apparatus that can comprise a memory that stores data relating to a communication network comprising one or more Node Bs that are capable of VoIP communication and one or more Node Bs that are not capable of VoIP communication, a terminal in the communication network for which a voice communication session is to be established, and one or more of a CS-domain paging request or a PS-domain paging request for which selective paging is indicated. The wireless communications apparatus can further comprise a processor configured to deliver pages in response to a CS-domain paging request for which selective paging is indicated to Node Bs that are not capable of VoIP communication and to deliver pages in response to a PS-domain paging request for which selective paging is indicated to Node Bs that are capable of VoIP communication.

A further aspect relates to an apparatus that facilitates communication of paging signals in a wireless communication system. The apparatus can comprise means for determining that paging has been triggered in one or more of a CS or a PS radio domain; means for communicating a paging signal in the PS radio domain to a VoIP-capable access point; and means for communicating a paging signal in the CS radio domain to a non-VoIP-capable access point.

Yet another aspect relates to a computer readable medium, which can comprise code for causing a computer to identify a request for paging signals to be transmitted to a UE in a wireless communication system comprising one or more PS voice-capable Node Bs and one or more non-PS voice-capable Node Bs; and code for causing a computer to deliver a single paging signal to a Node B providing communication functionality for the UE, wherein the paging signal is a PS paging signal if the Node B is a PS voice-capable Node B or a CS paging signal otherwise.

Still another aspect relates to an integrated circuit that executes computer-executable instructions for establishing a voice call with a terminal located in a mixed VoIP-capable/non-VoIP-capable wireless communication system. The instructions can comprise receiving one or more paging requests over an Iu interface; and delivering a paging signal to a Node B providing network coverage for the terminal in response to the one or more paging requests, the paging signal establishes a VoIP call if the Node B is VoIP-capable or a circuit-switched call if the Node B is not VoIP-capable.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
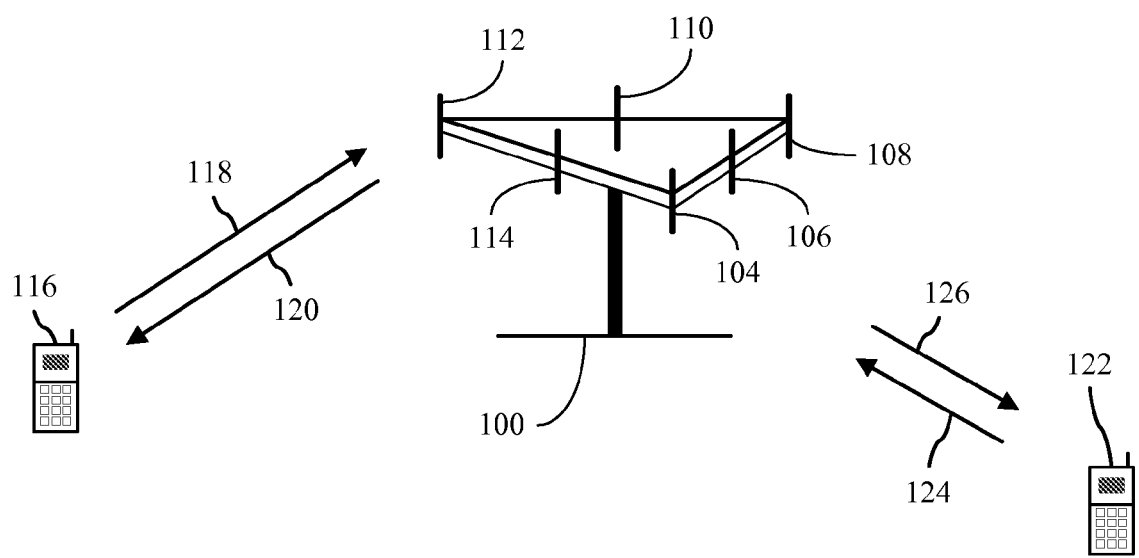
FIG. 1 illustrates a wireless multiple-access communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 is an illustration of a wireless multiple-access communication system in accordance with various aspects. In one example, an access point 100 (AP) includes multiple antenna groups. As illustrated in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. In another example, an access terminal 116 (AT) can be in communication with antennas 112 and 114, where antennas 112 and 114 transmit information to access terminal 116 over forward link 120 and receive information from access terminal 116 over reverse link 118. Additionally and/or alternatively, access terminal 122 can be in communication with antennas 106 and 108, where antennas 106 and 108 transmit information to access terminal 122 over forward link 126 and receive information from access terminal 122 over reverse link 124. In a frequency division duplex (FDD) system, communication links 118, 120, 124 and 126 can use different frequency for communication. For example, forward link 120 may use a different frequency then that used by reverse link 118.

Each group of antennas and/or the area in which they are designed to communicate can be referred to as a sector of the access point. In accordance with one aspect, antenna groups can be designed to communicate to access terminals in a sector of areas covered by access point 100. In communication over forward links 120 and 126, the transmitting antennas of access point 100 can utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point, e.g., access point 100, can be a fixed station used for communicating with terminals and can also be referred to as a base station, a Node B, an access network, and/or other suitable terminology. In addition, an access terminal, e.g., an access terminal 116 or 122, can also be referred to as a mobile terminal, user equipment (UE), a wireless communication device, a terminal, a wireless terminal, and/or other appropriate terminology.

Figure 2:
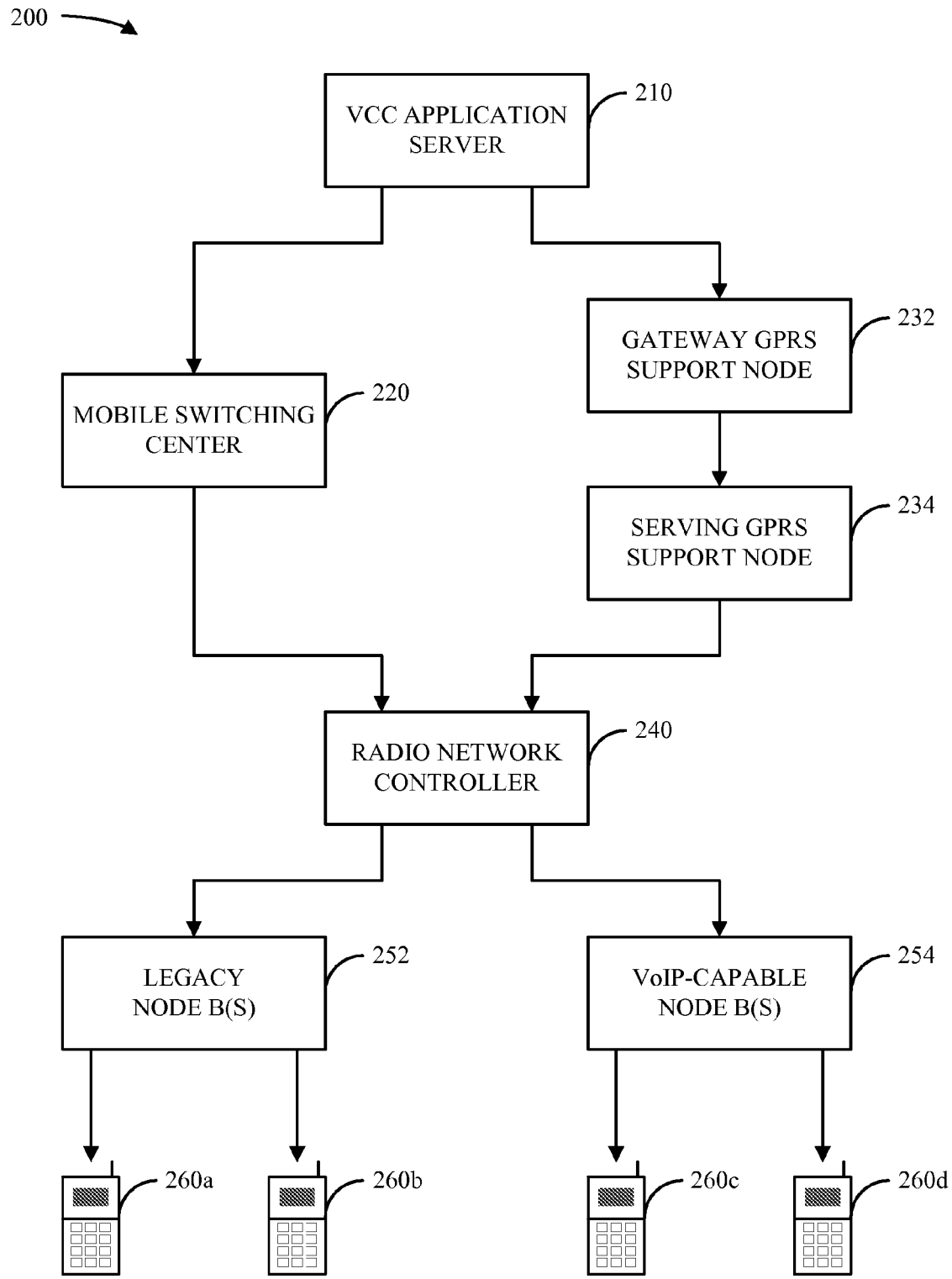
FIG. 2 is a block diagram of a system that facilitates establishment of a voice call in a wireless communication system.

FIG. 2 is a block diagram of a system 200 that facilitates establishment of a voice call in a wireless communication system. In accordance with one aspect, system 200 can be utilized to establish a voice communication session or call at a mobile terminal 260 with support for Voice Call Continuity (VCC). VCC is a technique by which a communication session can be seamlessly transferred between wireless access points or Node Bs 252 and/or 254, each of which may utilize different protocols for communication, as a mobile terminal 260 moves from the coverage area of one Node B 252 and/or 254 to another. In one example, VCC can be managed by a VCC application server (AS) 210 in system 200. For example, voice calls can be configured to be "anchored" at VCC AS 210, based on which VCC AC 210 can manage calls through handover operations between Node Bs 252 and/or 254. In one example, VCC AS 210 can manage handover of a communication session from a first Node B that utilizes a first communication protocol to a second Node B that utilizes a second communication protocol. For example, such a handover can be conducted from a High-Speed Packet Access (HSPA) network (e.g., for a Voice over Internet Protocol (VoIP) call) to a circuit switched communication network.

In accordance with one aspect, VCC AS 210 can utilize different techniques for establishing a communication session based on whether the session is to be carried out in the packet switched (PS) radio domain or the circuit switched (CS) radio domain. In one example, a voice call can be conducted in the PS radio domain by managing the transfer of information between communicating entities as packets of data over data links that can be shared with other traffic. Examples of voice calls that can be conducted in the PS radio domain include VoIP calls utilizing HSPA and/or any other suitable data communication protocol wherein voice data is communicated as packets on a data link. A voice call can be implemented in the PS radio domain using, for example, General Packet Radio Service (GPRS), which utilizes a Gateway GPRS Support Node (GGSN) 232 and/or a Serving GPRS Support Node (SGSN) 234 for creating and/or managing a packet data connection between communicating entities. In one example, GGSN 232 can serve as a gateway between a wireless data network providing communication functionality for mobile terminals 260 and another network or internetwork, such as the Internet and/or another suitable network, to deliver packets between the wireless data network and the other network or internetwork. Additionally and/or alternatively, SGSN 234 can communicate between GGSN 232 and a mobile terminal 260 to directly deliver packets to and/or from the mobile terminal 260.

Accordingly, to establish a VoIP call and/or another suitable voice call in the PS domain, VCC AS 210 can instruct PS-domain call setup at GGSN 232 and/or SGSN 234, which can in turn initiate paging at a Radio Network Controller (RNC) 240 that coordinates one or more VoIP-capable Node Bs 254. Upon initiation of paging at RNC 240, RNC 240 can send a paging signal to one or more VoIP-capable Node Bs 254 to locate the appropriate mobile terminal 260. Upon locating the mobile terminal 260, RNC 240 can report back to VCC AS 210 via GGSN 232 and/or SGSN 234, thereby establishing the call through VCC AS 210. In one example, once a voice call in the PS radio domain has been established, the call can be carried over a PS bearer, controlled by Session Initiation Protocol (SIP) signaling, and/or terminated at VCC AS 210 by way of an IP Multimedia Subsystem (IMS).

In another example, a voice call can be conducted in the CS radio domain by establishing a point-to-point, fixed bandwidth circuit or channel between communicating entities and holding the circuit until conclusion of the call. Setup and management of circuit(s) utilized by a CS communication session can be performed by, for example, a Mobile Switching Center (MSC) 220. In accordance with one aspect, VCC AS 210 can initialize a voice call in the CS radio domain by instructing call setup at MSC 220, which can in turn initiate CS-domain paging at RNC 240. In one example, CS-domain paging can be conducted by RNC 240 by transmitting paging signals to one or more non-VoIP-capable or "legacy" Node Bs 252 in a similar manner to the PS-domain paging described above. In a conventional CS voice call, a Node B 252 and a mobile terminal 260 may consider themselves to be involved in termination of the call. However, to provide VCC support for a voice call in the CS domain, such a call can instead be managed and/or terminated at VCC AS 210. In one example, VCC AS 210 can manage termination of a CS-domain voice call by emulating normal call termination.

In accordance with another aspect, system 200 can include both legacy Node Bs 252 and VoIP-capable Node Bs 254. Thus, in some situations, it may be necessary or desirable to establish a VCC-supported call on a network that supports VoIP that can be relocated to a network that supports only CS voice communication, or vice versa. However, in such an example, VCC AS 210 may not have knowledge of whether a Node B 252 or 254 serving a mobile terminal 260 for which the call is to be established provides VoIP functionality. In conventional systems, a VCC AS would be required to indiscriminately through both the CS and PS domains in such a situation, which can cause a mobile terminal 260 to receive two ostensibly independent pages in a substantially simultaneous manner. Such pages can be interpreted by the mobile terminal 260 as conflicting, which can in turn cause the network to incur unnecessary bookkeeping and/or other overhead to prevent dangling resources and/or other similar inefficiencies. In another such example, one or more legacy Node Bs 252 may support low-rate PS data services but not support PS voice services such as VoIP. If a mobile terminal 260 served by such a Node B receives a PS-domain page, the mobile terminal 260 may attempt to respond to the page and unsuccessfully attempt to establish a VoIP call. In such a situation, it is desirable for the terminal to instead establish a CS call rather than a PS call, but conventionally there is no way to ensure that a CS page will arrive at the terminal before a PS page if CS paging and PS paging are performed indiscriminately.

To mitigate the above problems, VCC AS 210 can utilize one or more improved paging procedures as described in accordance with various aspects set forth herein to ensure that a mobile terminal 260 located in a network that contains both legacy Node Bs 252 and VoIP-capable Node Bs 254 receives a single page from the optimal domain currently serving the terminal. In one example, this can be accomplished by adding a flag or similar indication to paging requests provided to RNC 240 for establishing a VCC-supported call. Based on a flag provided with a paging request, RNC 240 can restrict paging to a subset of Node Bs 252 and/or 254 as appropriate instead of indiscriminately providing a paging signal to all Node Bs. Because a mobile terminal 260 receives only one page, it can establish a VoIP call if possible, or a CS call otherwise, without the risk of double paging for both domains. As a result, VCC AS 210 can ensure that the resulting call can always be handled by VCC for handover from an HSPA network to a CS-only network or vice versa. Techniques by which restricted paging can be performed are described in further detail infra.

Figure 3:
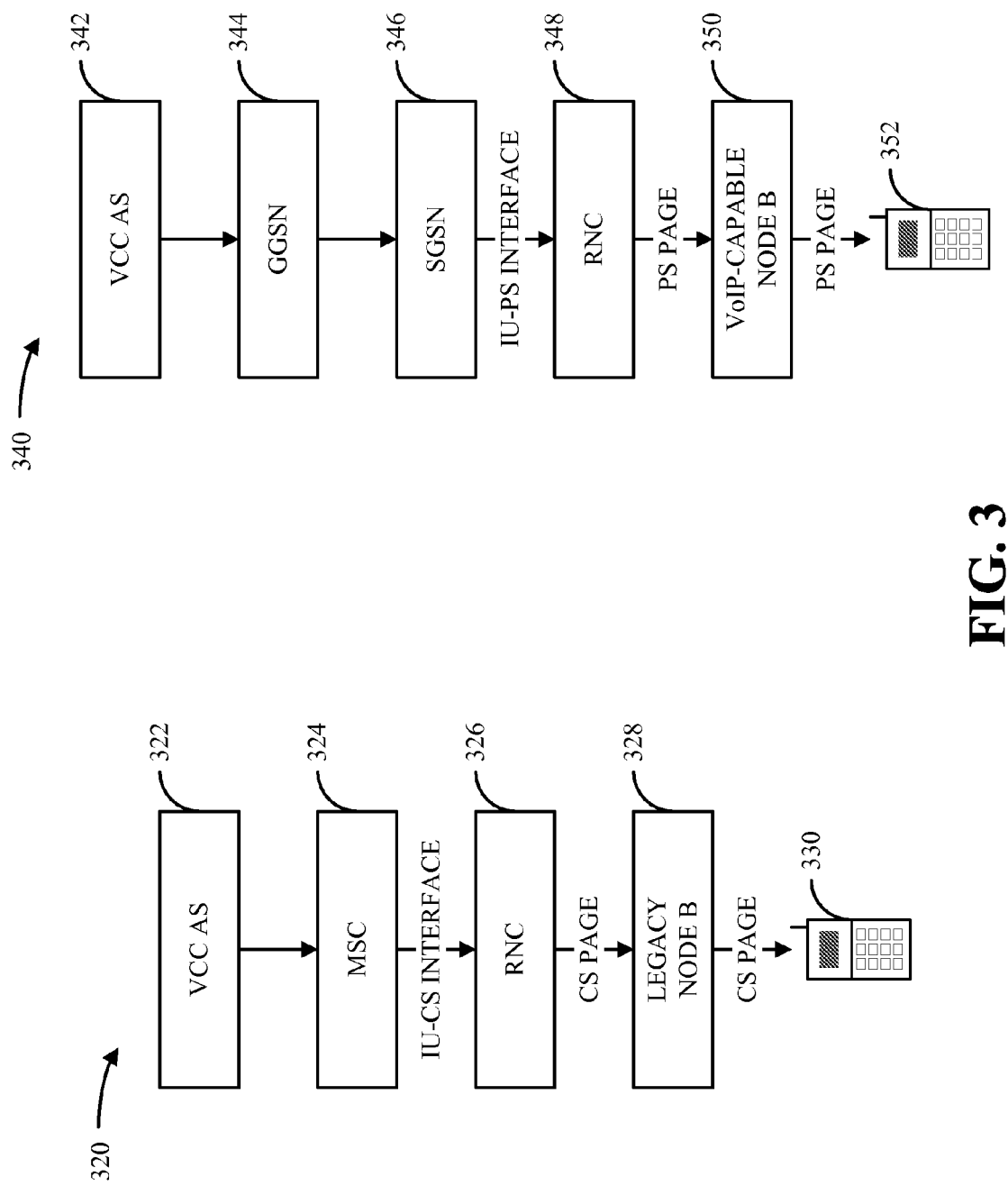
FIGS. 3-4 illustrate example paging procedures that can be performed by a wireless communication system.

Turning now to FIG. 3, diagrams 320 and 340 of example paging procedures that can be performed by a wireless communication system are illustrated. In one example, diagram 320 illustrates a procedure that can be utilized for a homogenous network consisting only of "legacy" Node Bs 328 that cannot support an HSPA VoIP call. As diagram 320 illustrates, a VCC AS 322 can cause an MSC 324 to page a user equipment (UE) 330 via a RNC 326. In one example, MSC 324 can relay a paging request to RNC 326 on an Iu-cs interface. Based on a received paging request, RNC 326 can send paging signals to one or more legacy Node Bs 328, which can relay the respective paging signals to locate the appropriate UE 330. Once the UE 330 has been located, the CS call can be established by the VCC AS 322. Subsequently, the call can be terminated by the VCC AS 322 by emulating normal termination of a CS call.

In another example, diagram 340 illustrates a procedure that can be utilized for a homogenous network consisting of only VoIP-capable Node Bs 350. As diagram 340 illustrates, a VCC AS 342 can instruct setup of a HSPA VoIP call for a UE 352 in such a case at a GGSN 344 and/or SGSN 346, which can in turn submit a PS-domain paging request to a RNC 348 over a Iu-ps interface. The RNC 348, in response to a paging request, can then communicate paging signals to one or more VoIP-capable Node Bs 350, which can relay the respective paging signals to locate the appropriate UE 352. Once the UE 352 has been located, the VoIP call can be established by the VCC AS 342 via an exchange of SIP signaling with the UE 352 and/or other appropriate means. Subsequently, the call can be terminated by the VCC AS 342 by employing one or more procedures provided by IMS.

Figure 4:
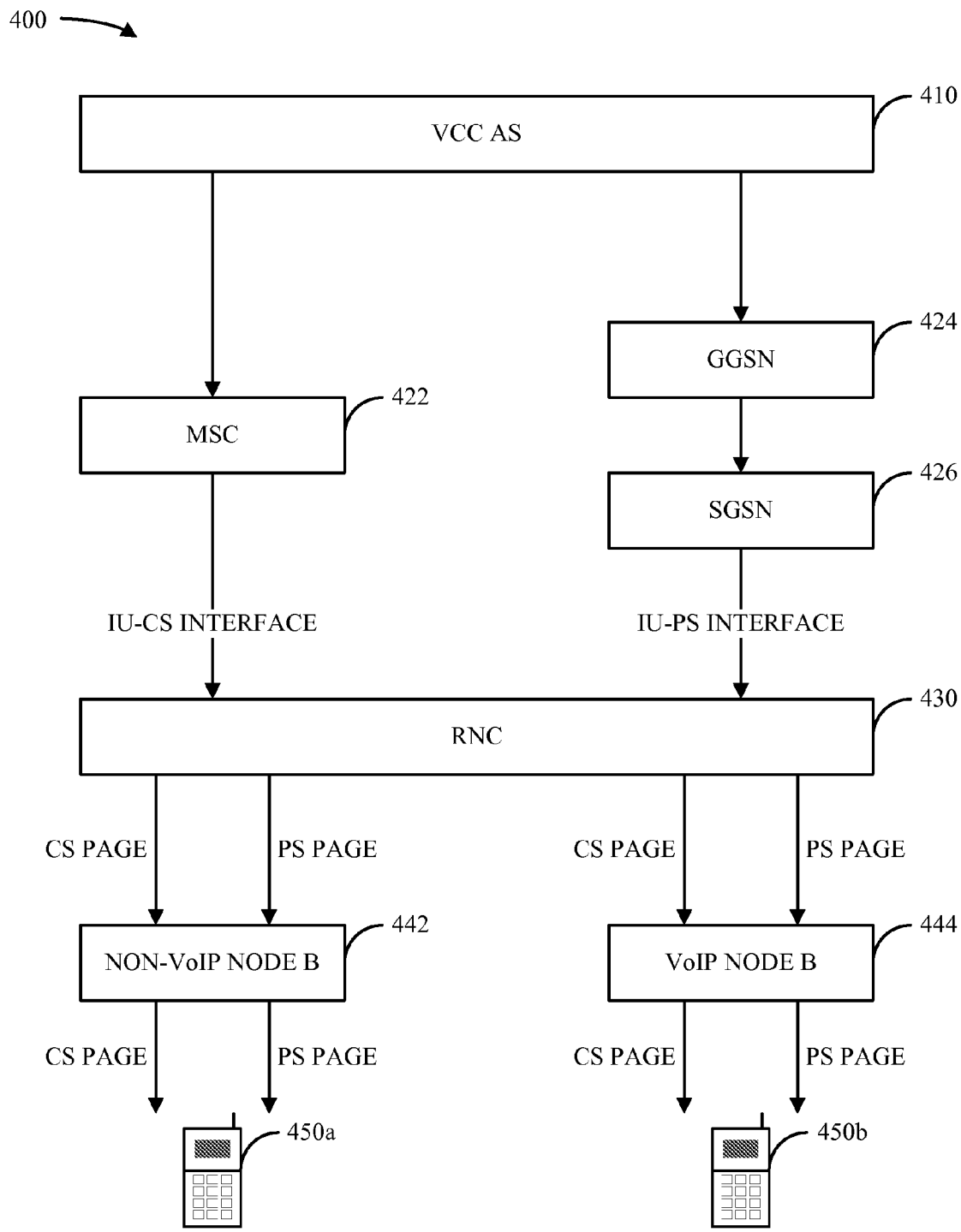

Referring to FIG. 4, a diagram 400 is provided that illustrates further example paging that can be conducted in a wireless communication system. In accordance with one aspect, and in contrast to diagrams 320 and 340 in FIG. 3, diagram 400 in FIG. 4 illustrates paging for a heterogeneous network, e.g., a network that contains both non-VoIP-capable Node Bs 442 and VoIP-capable Node Bs 444. As diagram 400 illustrates, paging can originate at a VCC AS 410 in a similar manner to that illustrated by FIGS. 2-3. Upon initialization of paging at VCC AS 410, a request for paging in the CS radio domain can be generated at a MSC 422 in a similar manner to diagram 320 in FIG. 3. Additionally and/or alternatively, a request for paging in the PS radio domain can be generated at a GGSN 424 and/or SGSN 426 in a similar manner to diagram 340 in FIG. 3. CS-domain and/or PS-domain paging requests can then be relayed to a RNC 430 via Iu-cs and/or Iu-ps interfaces, respectively. Upon receiving one or more paging requests, RNC 430 can provide paging signals in the corresponding radio domain(s) to Node B(s) 442 and/or 444 to locate an idle UE 450 for which a communication session is to be established.

However, in the case of a heterogeneous network such as that illustrated by diagram 400, wherein a mixture of legacy Node Bs 442 and VoIP-capable Node Bs 444 are present, higher network nodes such as VCC AS 410, MSC 422, GGSN 424, and/or SGSN 426 may not have the capability to ascertain which type of Node B 442 and/or 444 is serving a particular UE 450. Thus, in conventional systems, a VCC AS 410 is often forced to page indiscriminately through Node Bs 442 and/or 444 in both the CS and PS domains. As a result, a UE 450 can receive two apparently independent pages simultaneously or near simultaneously as a result of a single paging operation originated by VCC AS 410. This can create the illusion of a conflict, which can consequently require bookkeeping and/or other overhead to prevent dangling resources and/or other confusion or inefficiency in the network.

Some conventional systems have attempted to mitigate the above problem by performing paging as a two-step process, wherein PS-domain paging is initiated and executed and, if unsuccessful, CS-domain paging is then initiated and executed. However, in a situation such as when a legacy Node B 442 does not support HSPA VoIP but nonetheless does support low-rate data services and paging in the PS radio domain, a UE 450 served by such a Node B will be able to receive paging signals in the PS domain for all purposes, including voice calls. In response to a PS-domain page for a voice call, a UE 450 will respond to the page and attempt to become established on a PS call. However, because the Node B 442 serving the UE 450 is not suitable for VoIP use with reasonable performance, it can be appreciated that the call will fail or will proceed with significantly degraded performance. In such a situation, it can be appreciated that the desirable response would therefore be for the UE 450 to establish a CS call rather than a PS call. However, because PS paging is successful in such a case, CS paging would not be performed in a system that utilizes the conventional two-step paging process described above. Further, in the case where paging is performed indiscriminately, there has traditionally not been a way to ensure that the CS page will arrive at a UE 450 first in such a case.

To overcome these and/or other shortcomings of traditional paging methods, and in accordance with one aspect, a system as illustrated by diagram 400 can ensure that a UE 450 for which a voice call is to be established receives exactly one page in the optimal domain for the voice call based on a Node B 442 or 444 currently serving the UE 450. In one example, MSC 422, GGSN 424, SGSN 426, and/or RNC 430 can be configured to generate and/or utilize VCC flags or other indications in connection with paging signals relayed by the respective entities for establishing a voice call. Accordingly, when a paging request is received by RNC 430 with an associated VCC flag, RNC 430 can conduct paging of a subset of Node Bs 442 and/or 444 based on their respective capabilities rather than indiscriminately paging through all Node Bs 442 and 444. Various examples of techniques that can be utilized for the accomplishment of these ends are described as follows. These techniques are referred to herein as "split paging" and "sequential paging," and are respectively illustrated by FIG. 5 and FIG. 6.

Figure 5:
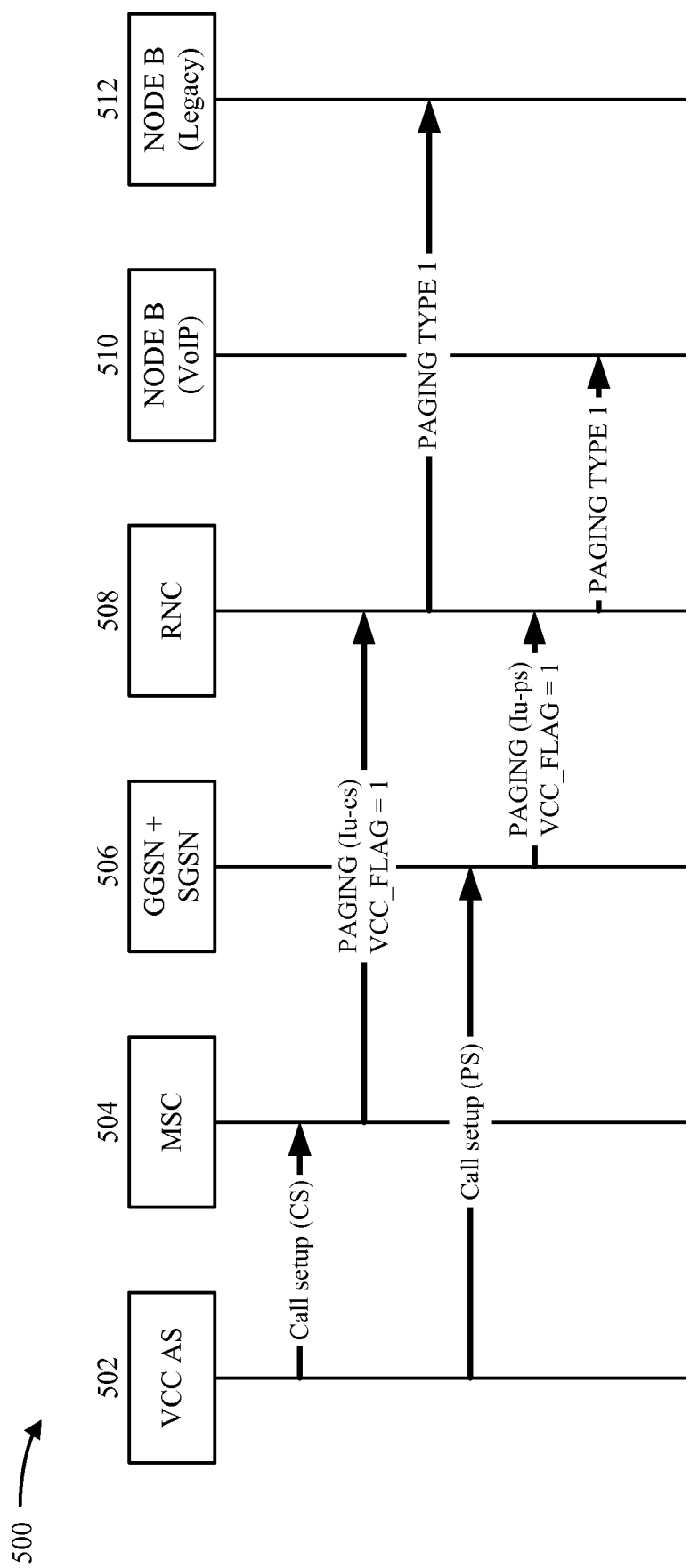
FIGS. 5-6 are message flow diagrams that illustrate example techniques for establishing a voice call supported by voice call continuity in a wireless communication system.

In accordance with one aspect, message flow diagram 500 in FIG. 5 illustrates a split paging technique for establishing a VCC-supported voice call in a system such as that illustrated by diagram 400. In one example, a VCC AS 502 utilizing split paging can trigger paging in the CS and PS domains simultaneously. However, unlike traditional paging techniques, resulting pages can then be delivered selectively such that PS pages go only to VoIP-capable Node Bs 510 and CS pages go only to non-VoIP-capable Node Bs 512. In one example, paging can be triggered by VCC AS 502 using call setup messages in the CS and PS domains. Although diagram 500 illustrates CS paging and PS paging as distinct series of transmissions for readability, it should be appreciated that CS paging and PS paging as illustrated by diagram 500 can occur in a substantially simultaneous or near simultaneous manner.

In accordance with another aspect, CS-domain and PS-domain call setup messages from VCC AS 502 can be respectively received at a MSC 504 and a GGSN and/or SGSN 506, which can then relay PAGING messages in the respective radio domains to a RNC 508. In one example, PAGING messages can be communicated by the MSC 504 and the GGSN and/or SGSN 506 pursuant to the Radio Access Network Application Part (RANAP) protocol on respective Iu interfaces. Further, as illustrated by diagram 500, a PAGING message communicated by MSC 504 over the Iu-cs interface and a PAGING message communicated by GGSN and/or SGSN 506 over the Iu-ps interface can be modified to contain a VCC flag (e.g., VCC_FLAG), which indicates that pages communicated in response to the respective PAGING messages should be restricted to certain Node Bs 510 and/or 512.

In one example, both VoIP-capable Node Bs 510 and legacy Node Bs 512 can be managed by a single RNC 508. Thus, in a conventional system, each of the two PAGING messages respectively received at the RNC 508 from the MSC 504 and the GGSN and/or SGSN 506 would ordinarily trigger two PAGING TYPE 1 messages, one to each Node B 510 and 512. In contrast, the VCC flags included in the respective PAGING messages can suppress this behavior, such that a CS page goes only to the legacy Node B 512 and a PS page goes only to a VoIP-capable Node B 510. Accordingly, it should be appreciated that the VCC flags allow a given Node B, and consequently respective UEs served by the Node B, to receive only a single page based on the optimal domain for conducting a voice call at the Node B. For example, a UE will receive a PS-domain page if its serving Node B is capable of PS voice communication or a CS-domain page otherwise. In accordance with one aspect, information regarding the VoIP capabilities of respective Node Bs 510 and/or 512 can be communicated to the RNC 508 by the Node Bs and/or another appropriate network entity and/or otherwise known a priori by the RNC 508.

Figure 6:
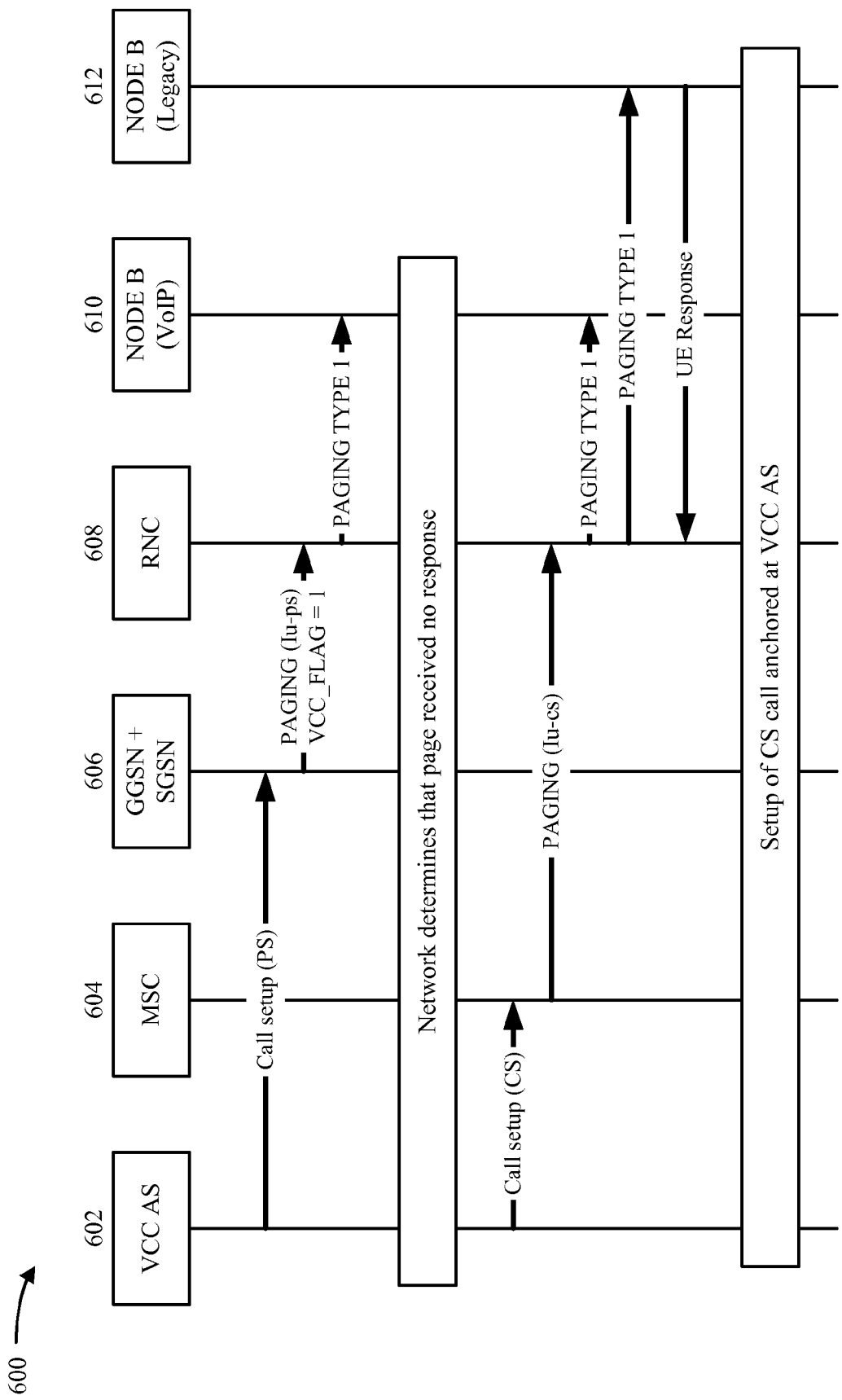

In accordance with another aspect, message flow diagram 600 in FIG. 6 illustrates a sequential paging technique for establishing a VCC-supported voice call in a system such as that illustrated by diagram 400. As diagram 600 illustrates, a VCC AS 602 can initiate paging in the PS domain prior to paging in the CS domain by sending a call setup message to a GGSN and/or SGSN 606, which can then relay a PAGING message to an RNC 608 on an Iu-ps interface. In one example, the PAGING message received by RNC 608 can include a VCC flag in a similar manner to the PAGING messages in the split paging technique illustrated by diagram 500. Based on the VCC flag, the RNC 608 can relay PAGING TYPE 1 signals to only VoIP-capable Node Bs 610. In accordance with one aspect, if the PS page produces no response, it can be presumed that a UE for which the voice call is to be established is served by a non-VoIP-capable or legacy Node B 612 and not a VoIP-capable Node B 610. Accordingly, a standard CS-domain page for the UE can be originated by VCC AS 602 and relayed to the UE via a legacy Node B 612.

In the specific, non-limiting example illustrated by diagram 600, a UE for which paging is being performed is served by a legacy Node B 612. Accordingly, the UE does not receive and does not respond to the PS-domain page, which is restricted to only the VoIP-capable Node B 610 by way of the VCC flag associated with the PS paging request submitted to RNC 608. The network can then determine that the PS page received no response by the UE in various manners. For example, RNC 608 and/or a VoIP-capable Node B 610 can maintain a timer that measures an amount of time that has elapsed from transmission of a paging signal. If no response is received from a UE within a predetermined amount of time, a failure notification can then be communicated to VCC AS 602 (e.g., via GGSN and/or SGSN 606). Alternatively, a timer can be maintained at the GGSN and/or SGSN 606 or VCC AS 602 itself, which can form the basis of a determination that no response has been received for a PS page if no acknowledgement of a UE response to the page is received from RNC 608 within a predetermined amount of time. It should be appreciated, however, that these techniques are provided by way of example and not limitation and that other techniques could also be utilized. In contrast to the above, it can be observed from diagram 600 that in the event that a UE does respond to a PS page, a subsequent CS page is not necessary as the call can be set up as a VoIP call without requiring further action. Further, it can be observed from diagram 600 that sequential paging can be performed without any modification to paging in the CS domain. Thus, as diagram 600 illustrates, because it is already determined at the time a CS page is initiated that a UE is not served by a VoIP-capable Node B 610, no VCC flag is necessary for a subsequent CS page as the CS page can be communicated to VoIP-capable Node Bs 610 as well as legacy Node Bs 612.

Referring to FIGS. 7-10, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 7:
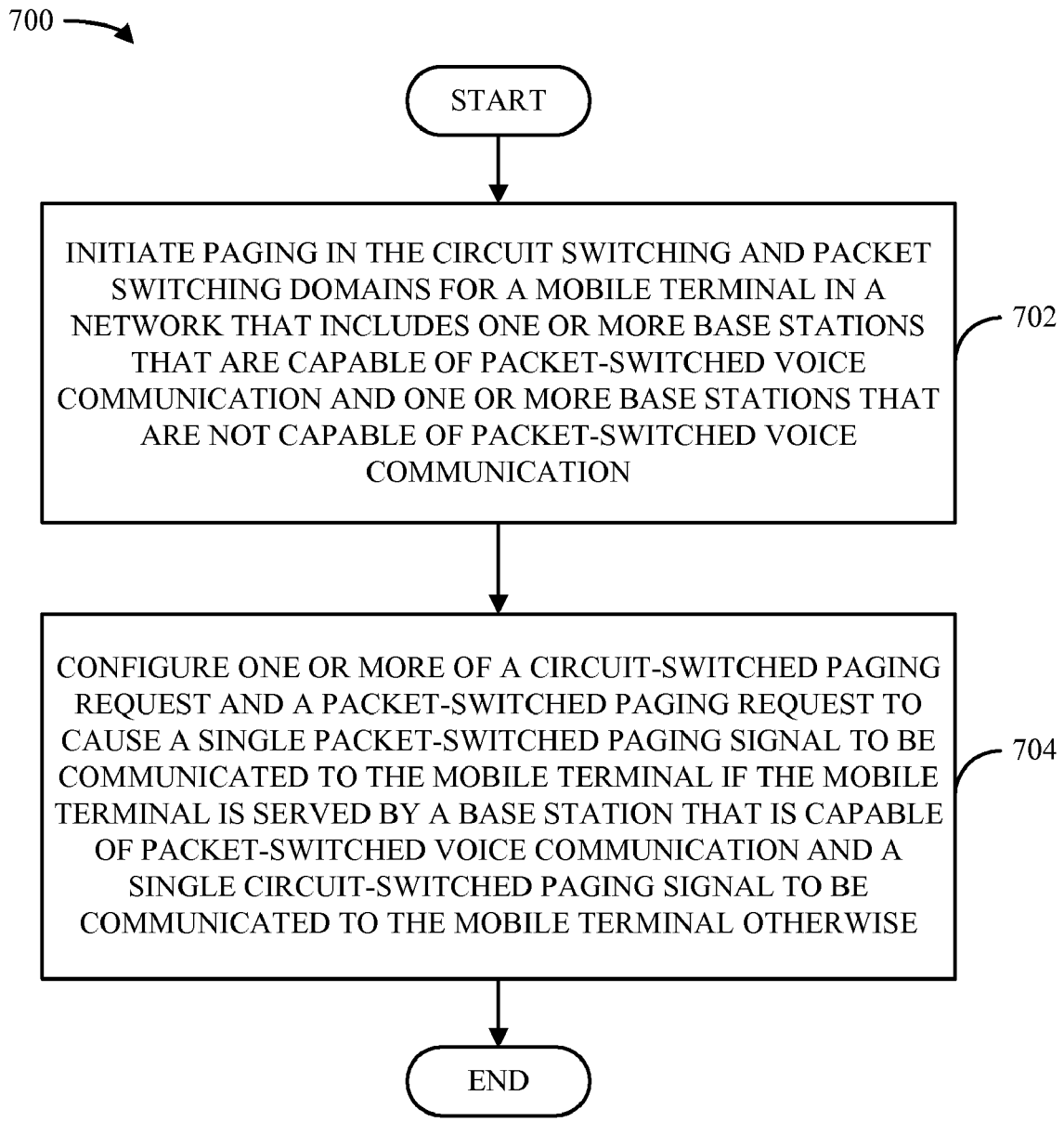
FIGS. 7-9 are flow diagrams of respective methodologies for initiating paging for establishing a wireless voice call.

With reference to FIG. 7, illustrated is a methodology 700 for conducting paging in a wireless communication system (e.g., system 200). It is to be appreciated that methodology 700 can be performed by, for example, a VCC platform (e.g., VCC AS 210), a MSC (e.g., MSC 220), a GPRS support node (e.g., GGSN 232 and/or SGSN 234), and/or any other appropriate network entity. Methodology 700 can be utilized, for example, to establish a VCC-supported voice call at a mobile terminal (e.g., a mobile terminal 260) located in the wireless communication system. Methodology 700 begins at block 702, wherein paging in the CS and PS domains is initiated for a mobile terminal in a network that includes one or more base stations that are capable of PS voice communication (e.g., VoIP-capable Node Bs 254) and one or more base stations that are not capable of PS voice communication (e.g., legacy Node Bs 252). In one example, PS voice communication functionality can be provided by capable base stations based on, for example, VoIP and/or any other suitable PS voice communication protocol. Further, paging can be initiated at block 702 by way of one or more call setup messages communicated by a VCC AS, a MSC, a GGSN, a SGSN, and/or any other suitable network entity.

Upon completing the act described at block 702, methodology 700 can proceed to block 704, wherein one or more of a CS paging request and a PS paging request are configured to cause a single PS paging signal to be communicated to the mobile terminal identified at block 702 if the mobile terminal is served by a base station that is capable of PS voice communication and a single CS paging signal to be communicated to the mobile terminal otherwise. In accordance with one aspect, the configuration of paging requests at block 704 allows for a single paging signal to be communicated to a mobile terminal in the optimal radio domain available to the terminal for voice communication, thereby mitigating the problems associated with conventional paging techniques described supra. In one example, paging requests can be configured at block 704 to include a flag or another indication that the paging request is being communicated for the purpose of establishing a VCC-supported voice call. When the flag or other provided indication is set in such a paging request, the paging request can facilitate restriction of paging responsive to the request to only base stations for which the radio domain corresponding to the paging request is optimal for voice communication. For example, a PS-domain paging request with a VCC indication can restrict paging to only VoIP-enabled base stations, while a CS-domain paging request with a VCC indication can restrict paging to only non-VoIP-enabled base stations.

Figure 8:
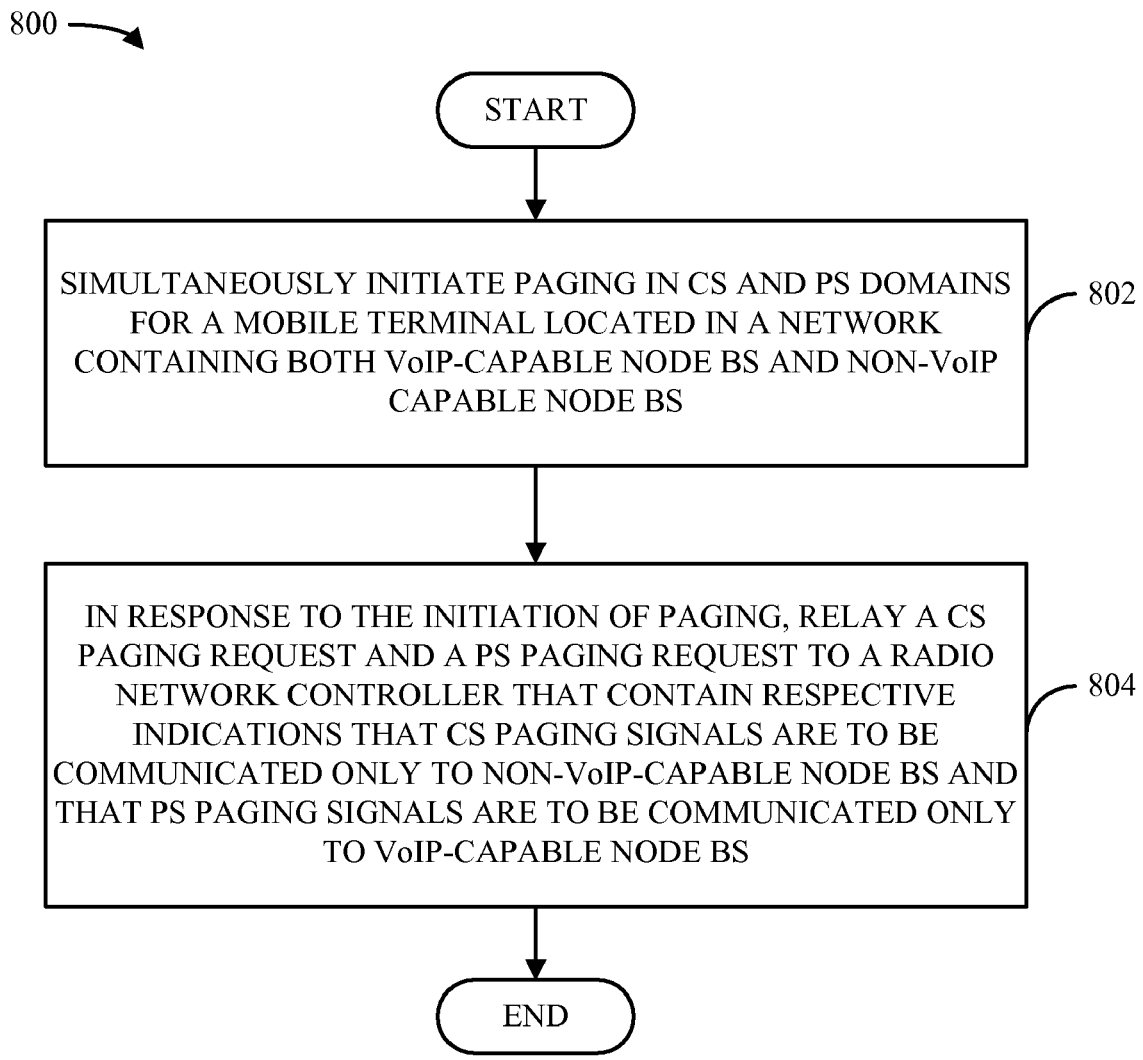

Turning now to FIG. 8, an additional methodology 800 for conducting paging in a wireless communication system is illustrated. It is to be appreciated that methodology 700 can be performed by, for example, a VCC controller (e.g., VCC AS 502), a MSC (e.g., MSC 504), a GPRS support node (e.g., GGSN/SGSN 506), and/or any other appropriate network entity. Methodology 800 can be utilized, for example, to establish a VCC-supported communication session at a mobile terminal located in the wireless communication system. Methodology 800 begins at block 802, wherein paging is simultaneously initiated in the CS and PS domains for a mobile terminal located in a network containing both VoIP-capable Node Bs (e.g., Node Bs 510) and non-VoIP-capable Node Bs (e.g., Node Bs 512). In one example, paging can be initiated by a VCC controller, a MSC, a GPRS support node, a combination thereof (e.g., via a call setup message communicated from a VCC controller to a MSC or GPRS support node), and/or any other appropriate network entity.

Upon completing the act described at block 802, methodology can conclude at block 804, wherein a CS paging request and a PS paging request are relayed to a RNC (e.g., RNC 508) that contain respective indications that CS paging signals are to be communicated only to non-VoIP-capable Node Bs and that PS paging signals are to be communicated only to VoIP-capable Node Bs. In accordance with one aspect, paging requests can be communicated to the RNC at block 804 over an Iu interface. For example, CS paging requests can be communicated from a MSC over an Iu-cs interface, and PS paging requests can be communicated from a GGSN and/or a SGSN over an Iu-ps interface. In one example, indications provided with paging requests at block 804 can comprise flag bits and/or other appropriate means to indicate that an associated paging request is being communicated to the RNC for establishment of a VCC-supported call. Based on these indications, the RNC can then restrict responsive paging in a requested domain to only Node Bs in the network for which the requested domain is optimal for voice communication. Thus, for example, CS paging signals can be communicated to non-VoIP-capable Node Bs, while PS paging signals can be communicated to VoIP-capable Node Bs. By restricting paging in this manner, many shortcomings of conventional paging techniques, such as double paging and/or paging in an incorrect and/or sub-optimal radio domain, can be mitigated.

Figure 9:
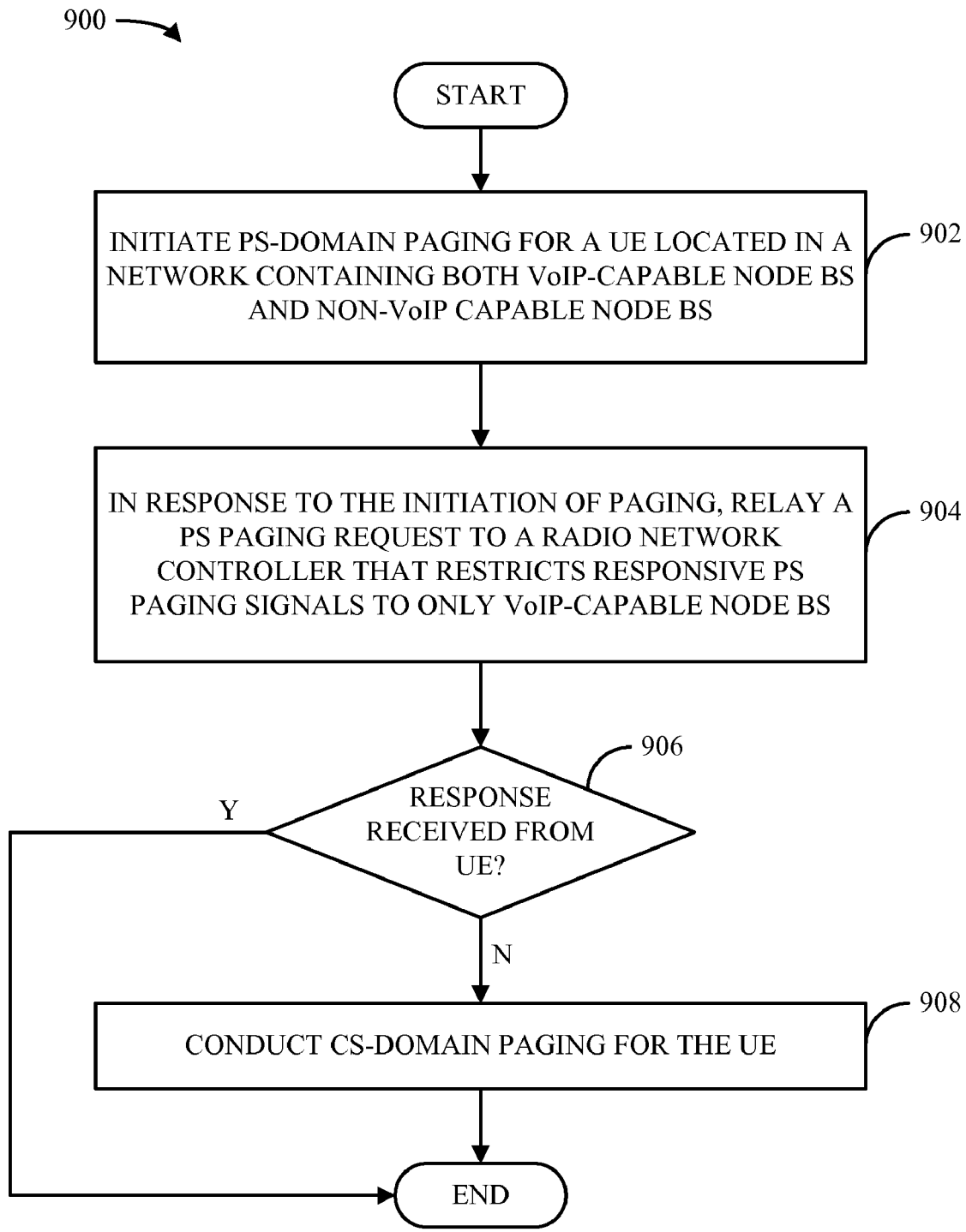

FIG. 9 illustrates a further methodology 900 for conducting paging in a wireless communication system. Methodology 900 can be performed by, for example, a VCC server (e.g., VCC AS 602), a MSC (e.g., MSC 604), a GPRS support node (e.g., GGSN/SGSN 606), and/or any other appropriate network entity. Methodology 900 can be utilized, for example, to establish a VCC-supported call at a UE located in the wireless communication system. Methodology 900 begins at block 902, wherein PS-domain paging is initiated for a UE located in a network containing both VoIP-capable Node Bs (e.g., Node Bs 610) and non-VoIP-capable Node Bs (e.g., Node Bs 612). PS-domain paging can be initiated at block 902, for example, by a VCC server, a GPRS support node, a combination thereof (e.g., via a call setup message communicated from a VCC server to GPRS support node), and/or any other appropriate network entity.

Methodology 900 can then continue to block 904, wherein a PS paging request is relayed to a RNC that restricts responsive PS paging signals to only VoIP-capable Node Bs. In accordance with one aspect, PS paging requests can be communicated to the RNC at block 904 by a VCC server and/or a GPRS support node over an Iu-ps interface. Further, an indication provided with a PS paging request at block 904 can include flag bits and/or any other suitable means for indicating that the PS paging request has been relayed to the RNC for establishment of a VCC-supported call.

After completing the acts described at block 904, and following paging by the RNC in response to the paging request relayed thereto at block 904, methodology 900 can proceed to block 906, wherein it is determined whether a response to a paging signal communicated by the RNC has been received from a UE. The determination at block 906 can be timer-based or notification-based. For example, a VCC server and/or GPRS support node can base a determination of whether a UE response has been received on an explicit indication from the RNC that the UE has either responded to the paging signal or has failed to respond. Additionally and/or alternatively, the VCC server and/or GPRS support node can conclude that a UE has not responded to paging if a predetermined period of time expires without receiving a notification that the UE has responded.

If it is determined at block 906 that the UE has responded to PS-domain paging, methodology 900 concludes. Otherwise, methodology 900 continues to block 908, wherein CS-domain paging is conducted for the UE. In accordance with one aspect, the indication provided with the PS paging request relayed at block 904 restricts responsive paging requests to only VoIP-capable Node Bs. Therefore, if a response to a paging request communicated based on the paging request is not received from a UE, it can be presumed that the UE is located at a Node B that does not support VoIP communication. As a result, paging for the UE can then be conducted in the CS radio domain to establish a CS communication session. In accordance with one aspect, CS-domain paging at block 908 can be conducted in any appropriate manner as generally known in the art. However, it should be appreciated that because PS-domain paging is restricted to only VoIP-capable Node Bs at block 904, various shortcomings of conventional paging techniques, such as redundant paging at a UE and/or problems associated with providing PS paging to non-VoIP-capable Node Bs, can be mitigated without requiring modification to CS paging at block 908.

Figure 10:
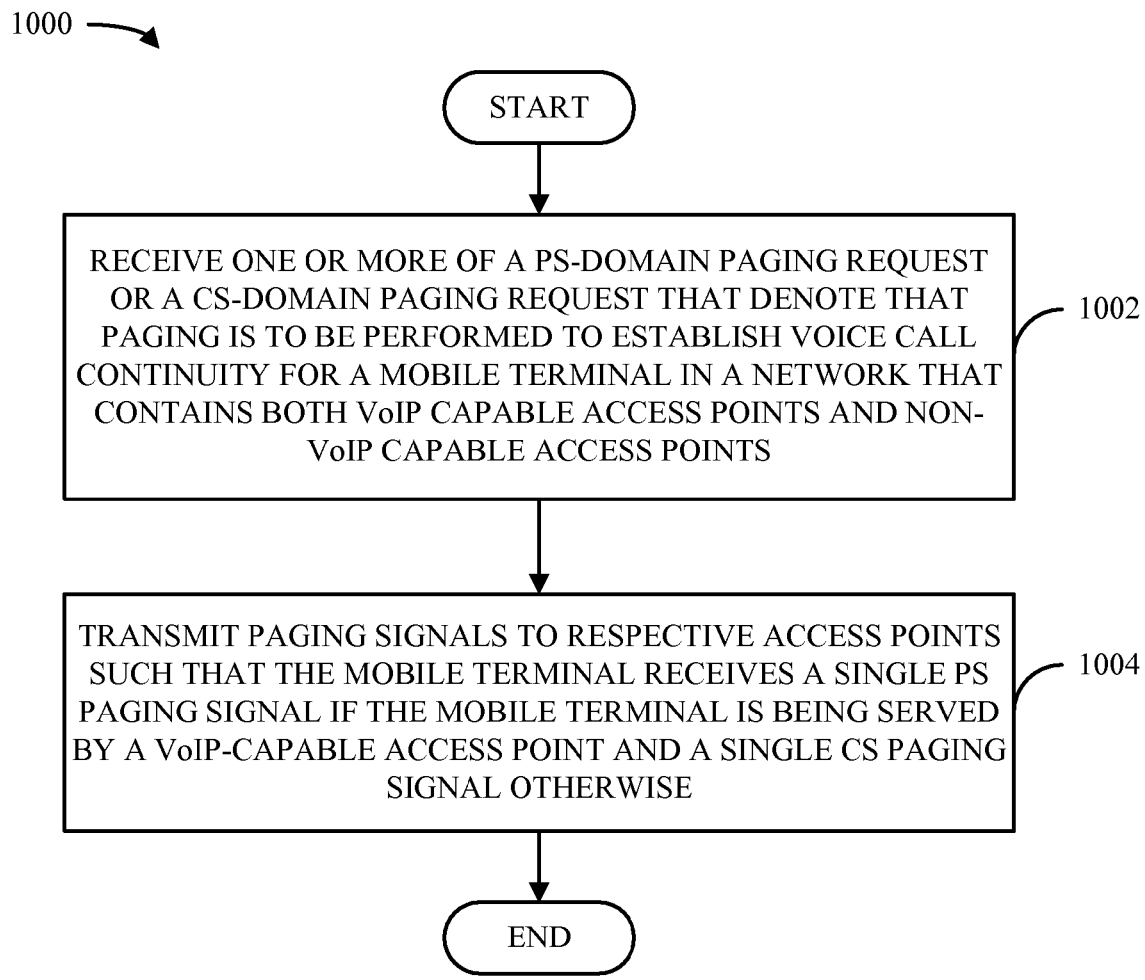
FIG. 10 is a flow diagram of a methodology for establishing a voice call with a mobile terminal.

Turning to FIG. 10, a methodology 1000 for establishing a voice call with a mobile terminal (e.g., a mobile terminal 260) is illustrated. It is to be appreciated that methodology 1000 can be performed by, for example, a RNC (e.g., RNC 240) and/or any other appropriate network entity. Methodology 1000 begins at block 1002, wherein one or more of a PS-domain paging request or a CS-domain paging request are received that denote that paging is to be performed to establish VCC for a mobile terminal in a network that contains both VoIP-capable APs (e.g., Node Bs 254) and non-VoIP-capable APs (e.g., Node Bs 252). PS-domain paging requests can be received from, for example, a VCC AS (e.g., VCC AS 210), a GGSN (e.g., GGSN 232), a SGSN (e.g., SGSN 234), and/or any other suitable network entity. Additionally and/or alternatively, a CS-domain paging request can be received from, for example, a VCC AS, a MSC (e.g., MSC 220), and/or any other appropriate entity. In accordance with one aspect, paging requests can be received in a substantially simultaneous manner (e.g., as illustrated by diagram 500) and/or at different time intervals (e.g., as illustrated by diagram 600). In accordance with another aspect, VCC denotations can be provided in less than all paging requests received at block 1002. For example, a PS-domain paging request with a VCC denotation and a CS-domain paging request without a VCC denotation, or vice versa, can be received at block 1002.

Methodology 1000 can then continue to block 1004, wherein paging signals are transmitted to respective APs such that the mobile terminal identified at block 1002 receives a single PS paging signal if the mobile terminal is being served by a VoIP-capable AP and a single CS paging signal otherwise. In one example, the manner in which paging signals are transmitted at block 1004 can be based on VCC denotations provided with the paging requests at block 1002. For example, PS paging signals transmitted in response to PS-domain paging requests received at block 1002 with VCC denotations can be restricted to only APs that support VoIP, and CS paging signals transmitted in response to CS-domain paging requests received at block 1002 with VCC denotations can be restricted to only APs that do not support VoIP. Further, paging signals can be transmitted in a single operation (e.g., PS pages can be transmitted to VoIP-capable APs and non-VoIP-capable APs simultaneously as illustrated by diagram 500) or as a series of operations (e.g., PS pages can first be transmitted to VoIP-capable APs followed by unrestricted CS pages to all APs if no response is received as illustrated by diagram 600). As a result, it can be made more likely that a mobile terminal will always receive exactly one page and that the terminal will never get a page for a radio domain that cannot effectively be utilized for a voice call.

Figure 11:
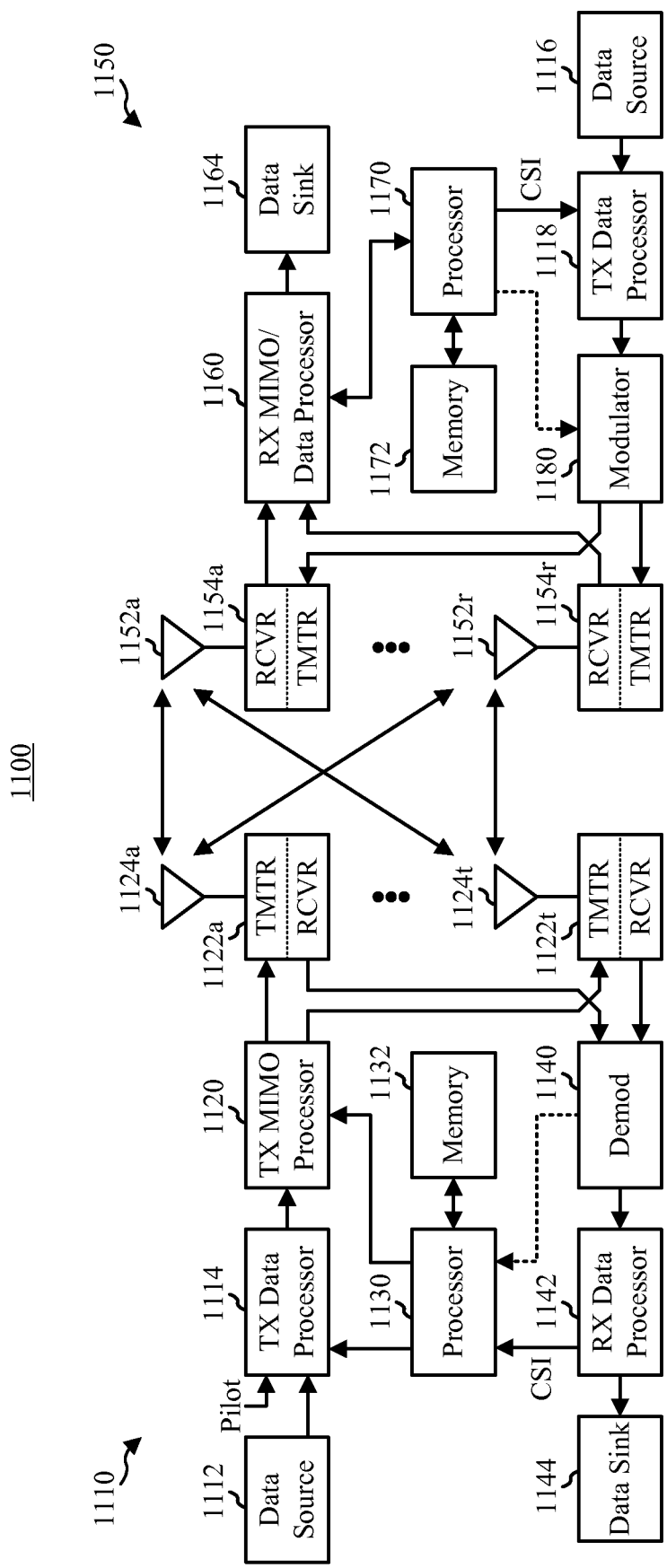
FIG. 11 is a block diagram illustrating an example wireless communication system in which various aspects described herein can function.

Referring now to FIG. 11, a block diagram illustrating an example wireless communication system 1100 in which one or more embodiments described herein can function is provided. In one example, system 1100 is a multiple-input multiple-output (MIMO) system that includes a transmitter system 1110 and a receiver system 1150. It should be appreciated, however, that transmitter system 1110 and/or receiver system 1150 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1110 and/or receiver system 1150 described herein could be utilized in connection with a single output to single input antenna system.

In accordance with one aspect, traffic data for a number of data streams are provided at transmitter system 1110 from a data source 1112 to a transmit (TX) data processor 1114. In one example, each data stream can then be transmitted via a respective transmit antenna 1124. Additionally, TX data processor 1114 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1150 to estimate channel response. Back at transmitter system 1110, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1130.

Next, modulation symbols for all data streams can be provided to a TX processor 1120, which can further process the modulation symbols (e.g., for OFDM). TX MIMO processor 1120 can then provides $N_T$ modulation symbol streams to $N_T$ transceivers 1122a through 1122t. In one example, each transceiver 1122 can receive and process a respective symbol stream to provide one or more analog signals. Each transceiver 1122 can then further condition (e.g., amplify, filter, and upconvert) the analog signals to provide a modulated signal suitable for transmission over a MIMO channel. Accordingly, $N_T$ modulated signals from transceivers 1122a through 1122t can then be transmitted from $N_T$ antennas 1124a through 1124t, respectively.

In accordance with another aspect, the transmitted modulated signals can be received at receiver system 1150 by $N_R$ antennas 1152a through 1152r. The received signal from each antenna 1152 can then be provided to respective transceivers 1154. In one example, each transceiver 1154 can condition (e.g., filter, amplify, and downconvert) a respective received signal, digitize the conditioned signal to provide samples, and then processes the samples to provide a corresponding "received" symbol stream. An RX MIMO/data processor 1160 can then receive and process the $N_R$ received symbol streams from $N_R$ transceivers 1154 based on a particular receiver processing technique to provide $N_T$ "detected" symbol streams. In one example, each detected symbol stream can include symbols that are estimates of the modulation symbols transmitted for the corresponding data stream. RX processor 1160 can then process each symbol stream at least in part by demodulating, deinterleaving, and decoding each detected symbol stream to recover traffic data for a corresponding data stream. Thus, the processing by RX processor 1160 can be complementary to that performed by TX MIMO processor 1120 and TX data processor 1114 at transmitter system 1110. RX processor 1160 can additionally provide processed symbol streams to a data sink 11164.

In accordance with one aspect, the channel response estimate generated by RX processor 1160 can be used to perform space/time processing at the receiver, adjust power levels, change modulation rates or schemes, and/or other appropriate actions. Additionally, RX processor 1160 can further estimate channel characteristics such as, for example, signal-to-noise-and-interference ratios (SNRs) of the detected symbol streams. RX processor 1160 can then provide estimated channel characteristics to a processor 1170. In one example, RX processor 1160 and/or processor 1170 can further derive an estimate of the "operating" SNR for the system. Processor 1170 can then provide channel state information (CSI), which can comprise information regarding the communication link and/or the received data stream. This information can include, for example, the operating SNR. The CSI can then be processed by a TX data processor 1118, modulated by a modulator 1180, conditioned by transceivers 1154a through 1154r, and transmitted back to transmitter system 1110. In addition, a data source 1116 at receiver system 1150 can provide additional data to be processed by TX data processor 1118.

Back at transmitter system 1110, the modulated signals from receiver system 1150 can then be received by antennas 1124, conditioned by transceivers 1122, demodulated by a demodulator 1140, and processed by a RX data processor 1142 to recover the CSI reported by receiver system 1150. In one example, the reported CSI can then be provided to processor 1130 and used to determine data rates as well as coding and modulation schemes to be used for one or more data streams. The determined coding and modulation schemes can then be provided to transceivers 1122 for quantization and/or use in later transmissions to receiver system 1150. Additionally and/or alternatively, the reported CSI can be used by processor 1130 to generate various controls for TX data processor 1114 and TX MIMO processor 1120. In another example, CSI and/or other information processed by RX data processor 1142 can be provided to a data sink 1144.

In one example, processor 1130 at transmitter system 1110 and processor 1170 at receiver system 1150 direct operation at their respective systems. Additionally, memory 1132 at transmitter system 1110 and memory 1172 at receiver system 1150 can provide storage for program codes and data used by processors 1130 and 1170, respectively. Further, at receiver system 1150, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 12:
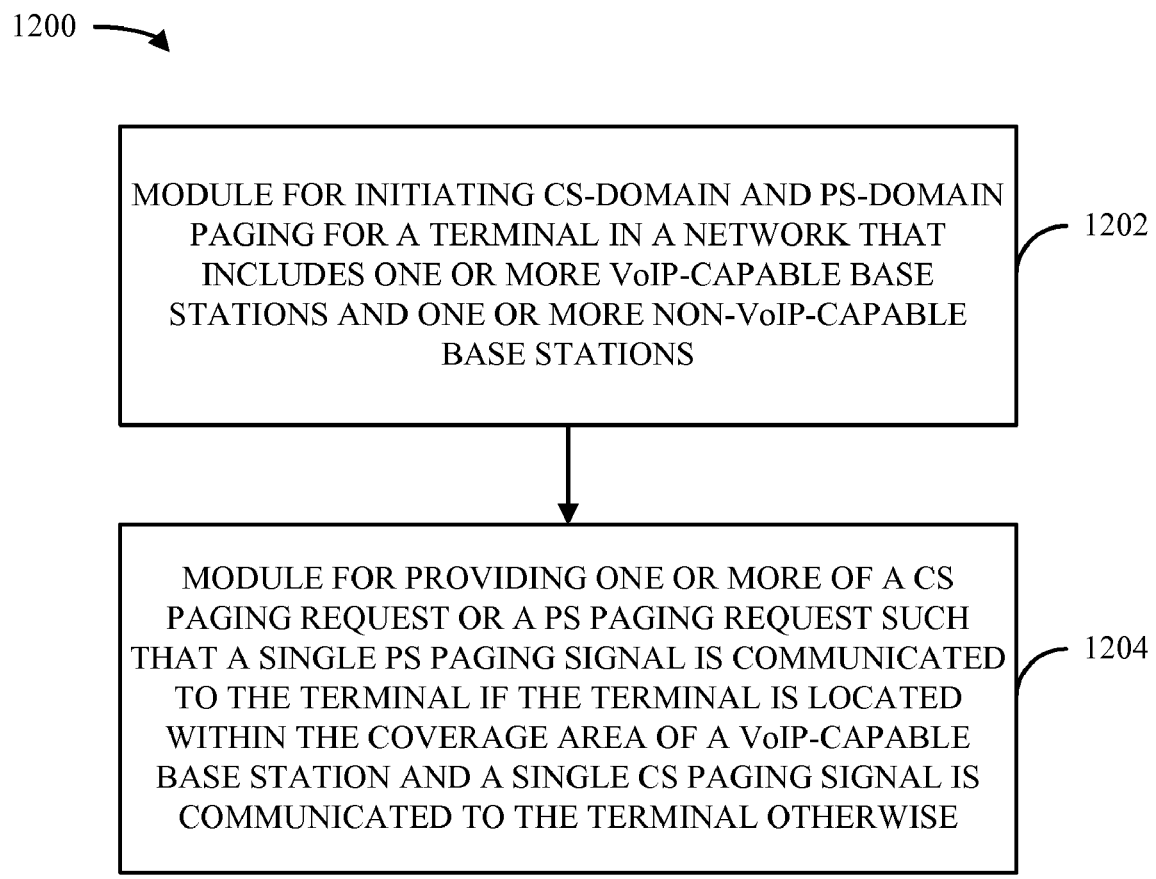
FIGS. 12-14 are block diagrams of respective apparatus that facilitate voice call initiation in a wireless communication system.

FIG. 12 illustrates an apparatus 1200 that facilitates voice call initiation in a wireless communication system (e.g., system 200). It is to be appreciated that apparatus 1200 is represented as including functional blocks, which can be functional blocks that represent functions implemented by a processor, software, or combination thereof (e.g., firmware). Apparatus 1200 can be implemented in a VCC platform (e.g., VCC AS 210), a MSC (e.g., MSC 220), a GPRS support node (e.g., GGSN 232 and/or SGSN 234), and/or any other appropriate network entity and can include a module 1202 for initiating CS-domain and PS-domain paging for a terminal in a network that includes one or more VoIP-capable base stations and one or more non-VoIP-capable base stations. Apparatus 1200 can further include a module 1204 for providing one or more of a CS paging request or a PS paging request such that a single PS paging signal is communicated to the terminal if the terminal is located within the coverage area of a VoIP-capable base station and a single CS paging signal is communicated to the terminal otherwise.

Figure 13:
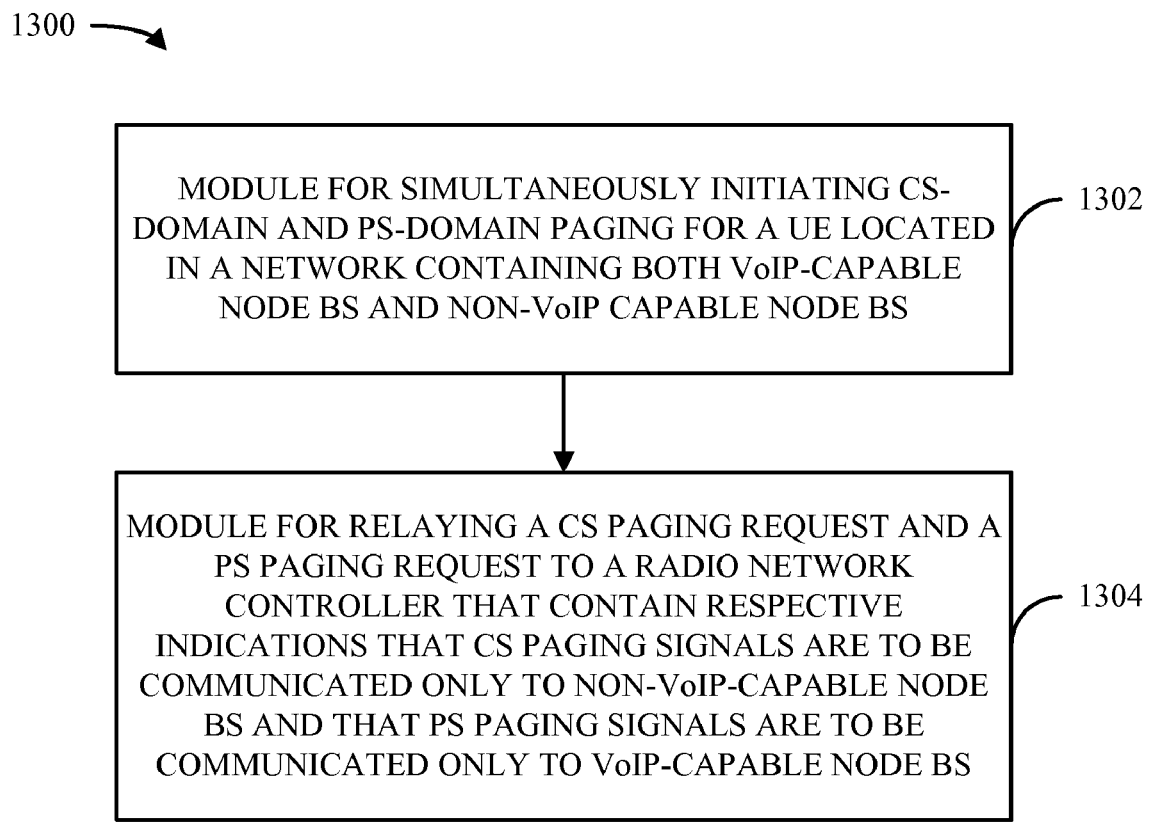

FIG. 13 illustrates another apparatus 1300 that facilitates voice call initiation in a wireless communication system. Apparatus 1300 is represented as including functional blocks, which can be functional blocks that represent functions implemented by a processor, software, or combination thereof. Apparatus 1300 can be implemented in a VCC server, a MSC, a GPRS support node, and/or any other appropriate network entity and can include a module 1302 for simultaneously initiating CS-domain and PS-domain paging for a UE located in a network containing both VoIP-capable Node Bs and non-VoIP-capable Node Bs. Apparatus 1300 can additionally include a module 1304 for relaying a CS paging request and a PS paging request to a radio network controller that contain respective indications that CS paging signals are to be communicated only to non-VoIP-capable Node Bs and that PS paging signals are to be communicated only to VoIP-capable Node Bs.

Figure 14:
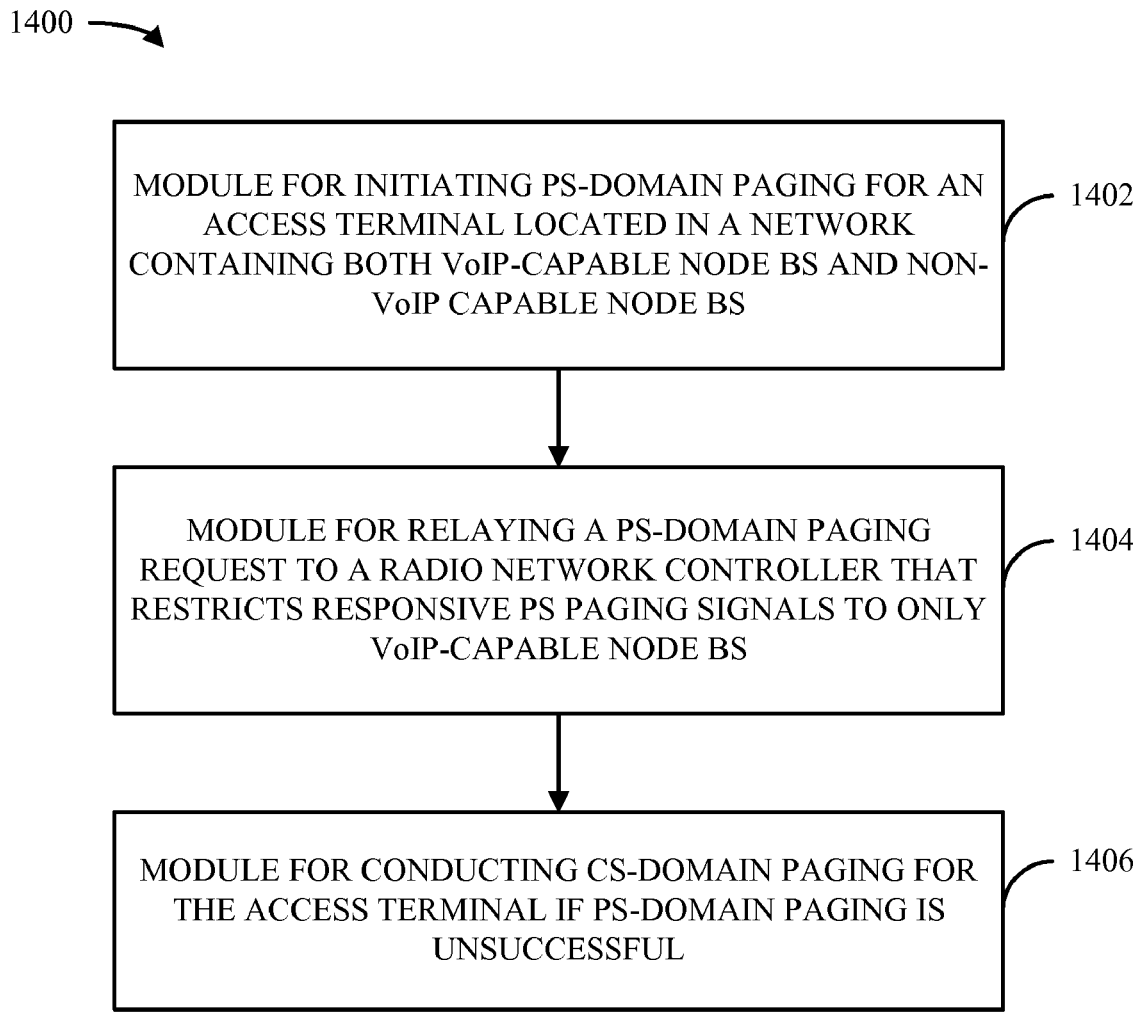

FIG. 14 illustrates an additional apparatus 1400 that facilitates voice call initiation in a wireless communication system. Apparatus 1400 is represented as including functional blocks, which can be functional blocks that represent functions implemented by a processor, software, or combination thereof. Apparatus 1400 can be implemented in a VCC controller, a MSC, a GPRS support node, and/or any other appropriate network entity and can include a module 1402 for initiating PS-domain paging for an access terminal located in a network containing both VoIP-capable Node Bs and non-VoIP-capable Node Bs, a module 1404 for relaying a PS paging request to a radio network controller that restricts responsive PS paging signals to only VoIP-capable Node Bs, and a module 1406 for conducting CS-domain paging for the access terminal if PS-domain paging is unsuccessful.

Figure 15:
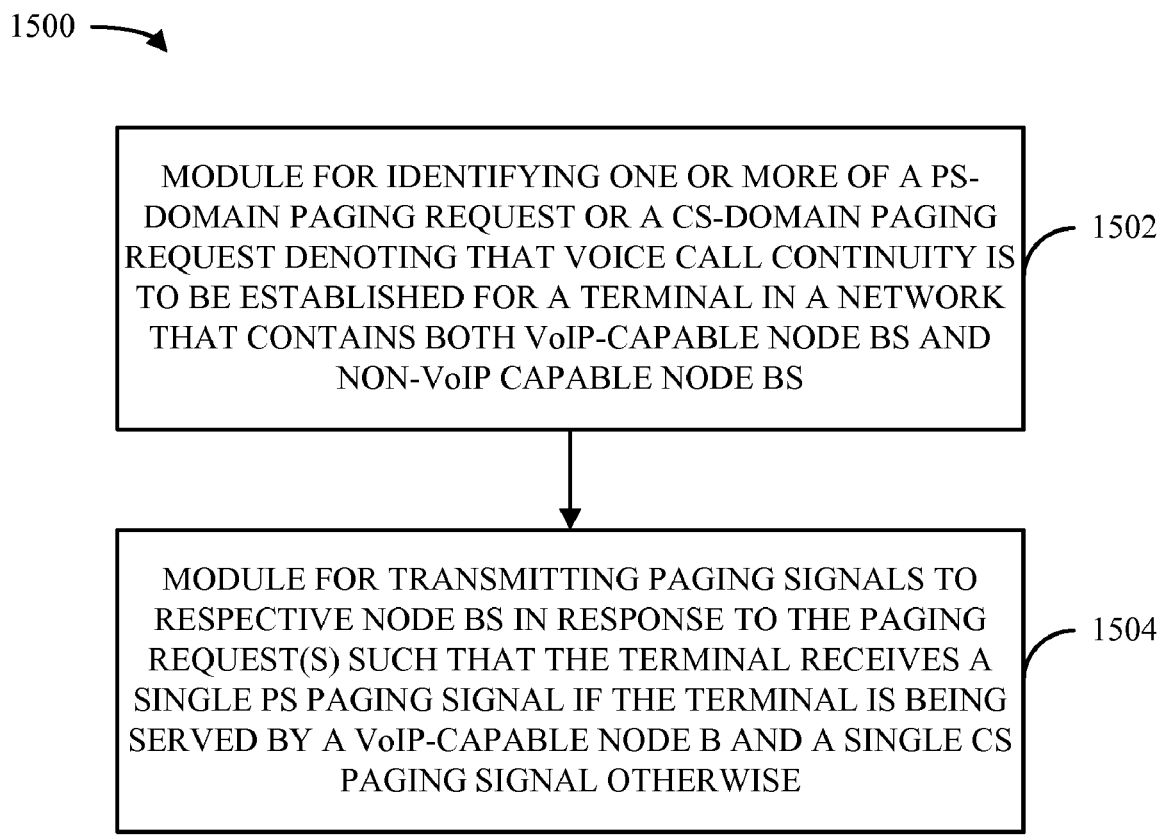
FIG. 15 is a block diagram of an apparatus that facilitates paging for a terminal in a wireless communication system.

FIG. 15 illustrates an apparatus that facilitates paging for a terminal in a wireless communication system. Apparatus 1500 is represented as including functional blocks, which can be functional blocks that represent functions implemented by a processor, software, or combination thereof. Apparatus 1500 can be implemented in a RNC (e.g., RNC 240) and/or any other appropriate network entity and can include a module 1502 for identifying one or more of a PS-domain paging request or a CS-domain paging request denoting that VCC is to be established for a terminal in a network that contains both VoIP-capable Node Bs and non-VoIP-capable Node Bs. Apparatus 1500 can further include a module 1504 for transmitting paging signals to respective Node Bs in response to the paging request(s) such that the terminal receives a single PS paging signal if the terminal is being served by a VoIP-capable Node B and a single CS paging signal otherwise.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for conducting paging in a wireless communication network, comprising:

initiating a first paging request in a circuit switched domain and a second paging request in a packet switched domain of the network to a terminal operating in the network, the network including at least a first base station that is capable of voice communication in the packet switched domain and at least a second base station that is not capable of voice communication in the packet switched radio domain;

associating a first indicator with the first paging request for requesting paging in the circuit switched domain, the first indicator indicating that the first paging request is restricted to the at least the second base station that is not capable of voice communication in the packet switched domain; and associating a second indicator with the second paging request requesting paging in the packet switched domain, the second indicator indicating that the second paging request is restricted to the at least the first base station that is capable of voice communication in the packet switched domain.

2. The method of claim 1, wherein the first and second paging requests are configured such that the terminal receives a paging signal in the packet switched domain if the terminal is served by one of the at least the first base station that is capable of voice communication in the packet switched domain or a paging signal in the circuit switched domain otherwise.

3. The method of claim 1, wherein the initiating comprises initiating the first paging request and the second paging request substantially simultaneously.

4. The method of claim 3, wherein the first indicator comprises a first bit and the second indicator comprises a second bit.

5. The method of claim 3, further comprising communicating the first paging request and the second paging request to a radio network controller.

6. The method of claim 1, further comprising determining whether a response to a paging signal communicated pursuant to the second paging request is received from the terminal, and repeating paging pursuant to the first paging request if no response from the terminal is received.

7. The method of claim 6, wherein the determining whether the response to the paging signal communicated pursuant to the second paging request is received from the terminal comprises identifying one of a successful paging notification or a failure notification provided by a radio network controller in response to the paging signal being communicated by the radio network controller.

8. The method of claim 6, wherein the determining whether the response to the paging signal communicated pursuant to the second paging request is received from the terminal comprises determining whether notification of the response by the terminal to the paging signal communicated by a radio network controller is received within a predetermined amount of time.

9. The method of claim 1, further comprising establishing a voice call for the terminal upon successful paging of the terminal pursuant to the first paging request or the second paging request, wherein the voice call is established in the packet switched domain or the circuit switched domain based on whether the first pagine request or the second paging request results in the successful paging.

10. The method of claim 1, wherein voice communication in the packet switched domain is based on voice over internet protocol.

11. A wireless communications apparatus, comprising:
a memory that stores data relating to a wireless communication network comprising at least a first base station capable of voice communication in a packet switched domain and at least a second base station not capable of voice communication in the packet switched domain and a user equipment in the wireless communication network for which a voice communication session is to be established; and
a processor configured to:
initiate a first paging request in a circuit switched domain and a second paging request in the packet switched domain of the wireless communication network to the user equipment;
associate a first indicator with the first paging request for requesting paging in the circuit switched domain, the first indicator indicating that the first paging request is restricted to the at least the second base station that is not capable of voice communication in the packet switched domain; and
associate a second indicator with the second paging request requesting paging in the packet switched domain, the second indicator indicating that the second paging request is restricted to the at least the first base station that is capable of voice communication in the packet switched domain.

12. The wireless communications apparatus of claim 11, wherein the first and second paging requests are configured such that the user equipment receives a page in the packet switched domain if at least one of the at least one first base station has a coverage area that covers the user equipment or a page in the circuit switched domain otherwise.

13. The wireless communications apparatus of claim 11, wherein the processor is further configured to initiate the first paging request and the second paging request substantially simultaneously.

14. The wireless communications apparatus of claim 13, wherein the processor is further configured to communicate the first and second paging requests to a radio network controller.

15. The wireless communications apparatus of claim 11, wherein the processor is further configured to attempt to identify a response from the user equipment to a page relayed in response to the second paging request, and to repeat paging pursuant to the first paging request if no response is identified from the user equipment.

16. The wireless communication apparatus of claim 15, wherein the processor is further configured to provide the second paging request domain to a radio network controller and to instruct the radio network controller to communicate the page based on the second paging request.

17. The wireless communications apparatus of claim 15, wherein the processor is further configured to attempt to identify the response from the user equipment at least in part by identifying one of a successful paging notification or a failure notification provided by the radio network controller in response to the page communicated by the radio network controller.

18. The wireless communications apparatus of claim 16, wherein the processor is further configured to attempt to identify the response from the user equipment at least in part by determining whether notification of the response by the user equipment to page communicated by the radio network controller is received within a predetermined amount of time.

19. The wireless communications apparatus of claim 11, wherein the processor is further configured to establish a voice call with the user equipment in either the packet switched domain or the circuit switched domain based on whether the user equipment successfully receives a page pursuant to either the first paging request or the second paging request.

20. The wireless communications apparatus of claim 19, wherein the processor is further configured to perform one or more of the following acts:
managing a handoff of the voice call from the at least the first base station to the at least the second base station; or
managing a handoff of the voice call from the at least the second base station to the at least the first base station.

21. An apparatus that facilitates establishing a voice call with a mobile terminal operating in a network comprising at least a first base station that is capable of voice communication in a packet switched domain and at least a second base station that is not capable of voice communication in the packet switched domain, the apparatus comprising:
means for initiating a first paging request in of a circuit switched (CS) radio domain and a second paging request in the packet switched domain;
means for associating a first indicator with the first paging request for requesting paging in the circuit switched domain, the first indicator indicating that the first paging request is restricted to the at least the second base station that is not capable of voice communication in the packet switched domain; and means for associating a second indicator with the second paging request requesting paging in the packet switched domain, the second indicator indicating that the second paging request is restricted to the at least the first base station that is capable of voice communication in the packet switched domain.

22. The apparatus of claim 21, wherein the means for initiating paging comprises means for initiating the first paging request and the second paging request simultaneously or approximately simultaneously.

23. The apparatus of claim 21, further comprising means for determining whether the mobile terminal responds to a paging signal communicated responsive to the second paging request, and means for conducting paging pursuant to the first paging request for the mobile terminal if no response is received from the mobile terminal.

24. A non-transitory computer-readable medium, comprising:
code for causing a computer to initialize a first paging request in a circuit switched domain and a second paging request in a packet switched domain of a network to a terminal operating in the network, the network including at least a first base station that is capable of voice communication in the packet switched domain and at least a second base station that is not capable of communication in the packet switched domain;
code for causing a computer to associate a first indicator with the first paging request for requesting paging in the circuit switched domain, the first indicator indicating that the first paging request is restricted to the at least the second base station that is not capable of voice communication in the packet switched domain; and
code for causing a computer to associate a second indicator with the second paging request requesting paging in the packet switched domain, the second indicator indicating that the second paging request is restricted to the at least the first base station that is capable of voice communication in the packet switched domain.

25. The computer-readable medium of claim 24, wherein the code for causing a computer to initialize the first paging request and the second paging request comprises code for causing a computer to initialize the first paging request and the second paging request substantially simultaneously.

26. The computer-readable medium of claim 24, further comprising code for causing a computer to determine whether a response to a page communicated pursuant to the second paging request is received from the terminal, and code for causing a computer to instruct delivery of another page to the terminal pursuant to the first paging request if no response is received.

27. An integrated circuit that stores computer-executable instructions that when executed by the integrated circuit perform a method of establishing a voice call with an access terminal, the method comprising:
initiating a first paging request in a circuit switched domain and a second paging request in a packet switched domain of the network to the terminal operating in a network, the network including at least a first base station that is capable of voice communication in the packet switched domain and at least a second base station that is not capable of voice communication in the packet switched radio domain;
associating a first indicator with the first paging request for requesting paging in the circuit switched domain, the first indicator indicating that the first paging request is restricted to the at least the second base station that is not capable of voice communication in the packet switched domain; and
associating a second indicator with the second paging request requesting paging in the packet switched domain, the second indicator indicating that the second paging request is restricted to the at least the first base station that is capable of voice communication in the packet switched domain.

28. The integrated circuit of claim 27, wherein the initiating comprises initiating the first paging request and the second paging request substantially simultaneously.

29. The integrated circuit of claim 27, wherein the method further comprises determining whether the access terminal successfully received a page pursuant to the second paging request, and managing delivery of a another page to the access terminal pursuant to the first paging request if the access terminal did not successfully receive the page.

30. A method for establishing a voice call with a user equipment, the method comprising:
receiving a first paging request for requesting paging in a packet switched domain and a second paging request for requesting paging in a circuit switched domain, the first paging request being associated with a first indicator indicating that the first paging request is restricted to at least a first base station that is capable of voice communication in the packet switched domain, and the second paging request being associated with a second indicator indicating that the second paging request is restricted to at least a second base station that is not capable of voice communication in the packet switched domain; and
transmitting one or more of a first paging signal to a the at least the first base station and a second paging signal to the at least the second base station.

31. The method of claim 30, wherein the receiving comprises receiving the first paging request and the second paging request substantially simultaneously.

32. The method of claim 30, wherein the transmitting comprises transmitting the first paging signal, and further comprising:
determining whether a response to the first paging signal is received by the user equipment; and
generating a failure notification if no response is received by the user equipment.

33. The method of claim 32, further comprising providing the failure notification to a voice call continuity server if no response is received by the user equipment to the first paging signal.

34. The method of claim 33, further comprising:
receiving the second paging request in response to the failure notification.

35. The method of claim 30, wherein voice communication in the packet switched domain is based on voice over internet protocol.

36. A wireless communications apparatus, comprising:
a memory that stores data relating to a communication network comprising at least a first base station capable of voice communication in a packet switched domain and at least a second base station not capable of voice communication in the packet switched domain, a terminal in the communication network for which a voice communication session is to be established, and a first paging request of for paging in the packet switched domain and a second paging request for paging in a circuit switched domain, the first paging request being associated with a first indicator indicating that the first paging request is restricted to the at least the first base station that is capable of voice communication in the packet switched domain, and the second paging request being associated with a second indicator indicating that the second paging request is restricted to the at least the second base station that is not capable of voice communication in the packet switched domain; and a processor configured to deliver a first paging signal to the at least the first base station and a second paging signal to the at least the second base station.

37. The wireless communications apparatus of claim 36, further comprising a receiver configured to receive the first paging request and the second paging request simultaneously or approximately simultaneously.

38. The wireless communications apparatus of claim 36, wherein the processor is further configured to determine whether a response to the page first paging signal is received from the terminal, and to provide a result of the determination to an entity from which the first paging request was received.

39. An apparatus comprising:
means for receiving a first paging request for requesting paging in a packet switched domain and a second paging request for requesting paging in a circuit switched domain, the first paging request being associated with a first indicator indicating that the first paging request is restricted to at least a first base station that is capable of voice communication in the packet switched domain, and the second paging request being associated with a second indicator indicating that the second paging request is restricted to at least a second base station that is not capable of voice communication in the packet switched domain; and
means for transmitting one or more of a first paging signal to the at least the first base station and a second paging signal to the at least the second base station.

40. A non-transitory computer-readable medium, comprising:
code for causing a computer to receive a first paging request for requesting paging in a packet switched domain and a second paging request for requesting paging in a circuit switched domain, the first paging request being associated with a first indicator indicating that the first paging request is restricted to at least a first base station that is capable of voice communication in the packet switched domain, and the second paging request being associated with a second indicator indicating that the second paging request is restricted to at least a second base station that is not capable of voice communication in the packet switched domain; and
code for causing a computer to transmit one or more of a first paging signal to the at least the first base station and a second paging signal to the at least the second base station.

41. An integrated circuit that stores computer-executable instructions that when executed by the integrated circuit perform a method of establishing a voice call with a terminal, the method comprising
receiving a first paging request for requesting paging in a packet switched domain and a second paging request for requesting paging in a circuit switched domain, the first paging request being associated with a first indicator indicating that the first paging request is restricted to at least a first base station that is capable of voice communication in the packet switched domain, and the second paging request being associated with a second indicator indicating that the second paging request is restricted to at least a second base station that is not capable of voice communication in the packet switched domain; and
transmitting one or more of a first paging signal to the at least the first base station and a second paging signal to the at least the second base station.

* * * * *